(12) United States Patent
Hapgood et al.

(10) Patent No.: US 10,921,147 B1
(45) Date of Patent: Feb. 16, 2021

(54) CUSTOMER AND MERCHANT LOCATION-BASED ETA DETERMINATION

(71) Applicant: Amazon Technologies, Inc., Seattle, WA (US)

(72) Inventors: Ryan Hapgood, Belmont (AU); Jon R. Ducrou, West End (AU); Alexander Edwards, Brisbane (AU); Paul C. Hagar, Bainbridge Island, WA (US)

(73) Assignee: Amazon Technologies, Inc., Seattle, WA (US)

(*) Notice: Subject to any disclaimer, the term of this patent is extended or adjusted under 35 U.S.C. 154(b) by 184 days.

(21) Appl. No.: 16/116,693

(22) Filed: Aug. 29, 2018

(51) Int. Cl.
*G01C 21/34* (2006.01)
*G06Q 10/06* (2012.01)
*G06Q 10/08* (2012.01)

(52) U.S. Cl.
CPC ..... *G01C 21/3484* (2013.01); *G01C 21/3492* (2013.01); *G06Q 10/06311* (2013.01); *G06Q 10/087* (2013.01)

(58) Field of Classification Search
CPC ............ G01C 21/3484; G01C 21/3492; G06Q 10/06311; G06Q 10/087
See application file for complete search history.

(56) References Cited

U.S. PATENT DOCUMENTS

| | | |
|---|---|---|
| 4,360,875 A | 11/1982 | Behnke |
| 5,559,707 A | 9/1996 | DeLorme et al. |
| 6,026,375 A | 2/2000 | Hall et al. |
| 6,253,148 B1 | 6/2001 | Decaux et al. |
| 6,424,910 B1 | 7/2002 | Ohler et al. |
| 6,975,997 B1 | 12/2005 | Murakami et al. |
| 7,027,995 B2 | 4/2006 | Kaufman et al. |
| 7,080,019 B1 | 7/2006 | Hurzeler |
| 7,082,364 B2 | 7/2006 | Adamczyk |
| 7,136,747 B2 | 11/2006 | Raney |
| 7,212,975 B2 | 5/2007 | Bantz et al. |

(Continued)

FOREIGN PATENT DOCUMENTS

EP 2689391 1/2014

OTHER PUBLICATIONS

Bulut, et al., "LineKing: Coffee Shop Wait-Time Monitoring Using Smartphones", IEEE Transactions on Mobile Computing, vol. 14, No. 10, Oct. 2015, pp. 2045-2058.

*Primary Examiner* — Navid Ziaeianmehdizadeh
*Assistant Examiner* — Sean P Quinn
(74) *Attorney, Agent, or Firm* — Lee & Hayes, P.C.

(57) ABSTRACT

A customer offset may be determined with respect to a customer who has previously traveled to one or more merchant locations. A merchant location offset may be determined with respect to multiple customers who have each traveled to a particular merchant location. Upon determining that the customer is in transit to the merchant location, a generic ETA to the merchant location may be determined. A customer-based ETA for the customer with respect to the merchant location may be determined based on the generic ETA and the customer offset. Moreover, a merchant location-based ETA for the customer with respect to the merchant location may be determined based on the generic ETA and the merchant location offset. Based on the refined and more accurate ETAs, the merchant location may be instructed to begin assembling items for pick-up by the customer.

20 Claims, 6 Drawing Sheets

(56) References Cited

U.S. PATENT DOCUMENTS

| | | |
|---|---|---|
| 7,353,034 B2 | 4/2008 | Haney |
| 7,856,300 B2 | 12/2010 | Hozumi et al. |
| 8,090,707 B1 | 1/2012 | Orttung et al. |
| 8,140,256 B1 | 3/2012 | dos-Santos et al. |
| 8,145,417 B1 | 3/2012 | Chitre et al. |
| 8,150,608 B2 | 4/2012 | Cobbold |
| 8,285,570 B2 | 10/2012 | Meyer et al. |
| 8,340,890 B1 | 12/2012 | Cobbold |
| 9,406,084 B2 | 8/2016 | Havas |
| 9,507,346 B1 | 11/2016 | Levinson et al. |
| 10,453,025 B2 | 10/2019 | Agasti et al. |
| 10,460,411 B2 | 10/2019 | Liu |
| 10,467,579 B1 | 11/2019 | Reiss et al. |
| 10,467,581 B2 | 11/2019 | Laury et al. |
| 2001/0056363 A1 | 12/2001 | Gantz et al. |
| 2002/0062192 A1 | 5/2002 | Saraga et al. |
| 2002/0188492 A1 | 12/2002 | Borton |
| 2003/0100993 A1 | 5/2003 | Kirshenbaum et al. |
| 2003/0109266 A1 | 6/2003 | Rafiah et al. |
| 2003/0177020 A1 | 9/2003 | Okamura |
| 2003/0177072 A1 | 9/2003 | Bared |
| 2004/0049424 A1 | 3/2004 | Murray et al. |
| 2004/0177008 A1 | 9/2004 | Yang |
| 2004/0210621 A1 | 10/2004 | Antonellis |
| 2005/0033614 A1 | 2/2005 | Lettovsky et al. |
| 2006/0022048 A1 | 2/2006 | Johnson |
| 2006/0076397 A1 | 4/2006 | Langos |
| 2006/0155460 A1 | 7/2006 | Raney |
| 2006/0276960 A1 | 12/2006 | Adamczyk et al. |
| 2007/0088624 A1 | 4/2007 | Vaughn et al. |
| 2007/0106468 A1 | 5/2007 | Eichenbaum et al. |
| 2008/0054072 A1 | 3/2008 | Katragadda et al. |
| 2008/0059057 A1* | 3/2008 | Tengler ............ G01C 21/3626 701/465 |
| 2008/0082424 A1 | 4/2008 | Walton |
| 2008/0091342 A1 | 4/2008 | Assael |
| 2008/0319653 A1 | 12/2008 | Moshfeghi |
| 2009/0006194 A1 | 1/2009 | Sridharan et al. |
| 2009/0048878 A1 | 2/2009 | Metcalf |
| 2009/0187488 A1 | 7/2009 | Shamilian |
| 2009/0228325 A1* | 9/2009 | Simmons ............ G06Q 50/10 705/7.23 |
| 2010/0121662 A1 | 5/2010 | Becker |
| 2010/0274569 A1 | 10/2010 | Reudink |
| 2011/0238474 A1 | 9/2011 | Carr et al. |
| 2012/0191551 A1 | 7/2012 | Lutnick et al. |
| 2012/0232776 A1 | 9/2012 | Gontmakher et al. |
| 2012/0239289 A1 | 9/2012 | Gontmakher et al. |
| 2012/0290652 A1 | 11/2012 | Boskovic |
| 2012/0296885 A1 | 11/2012 | Gontmakher et al. |
| 2013/0041941 A1 | 2/2013 | Tomasic et al. |
| 2013/0317921 A1 | 11/2013 | Havas |
| 2014/0074743 A1 | 3/2014 | Rademaker |
| 2014/0244143 A1* | 8/2014 | Elwart ............ G01C 21/3492 701/117 |
| 2014/0279270 A1 | 9/2014 | Bertanzetti et al. |
| 2015/0161697 A1 | 6/2015 | Jones et al. |
| 2015/0356502 A1 | 12/2015 | Agasti et al. |
| 2016/0155088 A1 | 6/2016 | Pylappan et al. |
| 2016/0247113 A1 | 8/2016 | Rademaker |
| 2016/0292664 A1 | 10/2016 | Gilfoyle |
| 2017/0265040 A1* | 9/2017 | Friedlander ............ G08G 1/123 |
| 2017/0314950 A1* | 11/2017 | Tian ................... G01C 21/3492 |
| 2018/0060990 A1 | 3/2018 | Liu |
| 2018/0259345 A1* | 9/2018 | Wang ................... G08G 1/0129 |
| 2018/0364062 A1* | 12/2018 | Wang ................ G01C 21/3492 |
| 2019/0012625 A1* | 1/2019 | Lawrenson ............ G06Q 50/12 |
| 2019/0130260 A1* | 5/2019 | Han ...................... G06F 16/489 |
| 2019/0228375 A1 | 7/2019 | Laury et al. |
| 2019/0266557 A1* | 8/2019 | Berk .................. G06Q 10/0832 |
| 2020/0065734 A1* | 2/2020 | Szybalski .......... G06Q 30/0635 |

\* cited by examiner

CUSTOMER AND MERCHANT LOCATION-BASED ETA DETERMINATION

BACKGROUND

Consumers are increasingly ordering items in an online environment, such as via a website or a mobile application. Instead of requesting that the ordered items be delivered to a physical location associated with a customer (e.g., a personal residence, a workplace, etc.), the customer may opt to pick up the ordered items from a physical location of a merchant (e.g., a grocery store). In order to facilitate a positive customer experience, the merchant may desire to minimize the amount of time that the customer waits once he/she arrives at the physical location of the merchant. Although the merchant may be aware of the time that the customer is greeted by an individual at the physical location of the merchant, it is difficult to determine when the customer actually arrived to pick up his/her items, and how long the customer was waiting before they were greeted. Moreover, characteristics associated with a particular customer and/or a specific physical location of the merchant may impact whether customers arrive prior to, or after, a previously determined estimated time of arrival ("ETA") that indicates a predicted time that the customer will arrive at the physical location of the merchant. Extended wait times may cause customers to order and pick up the ordered items elsewhere.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
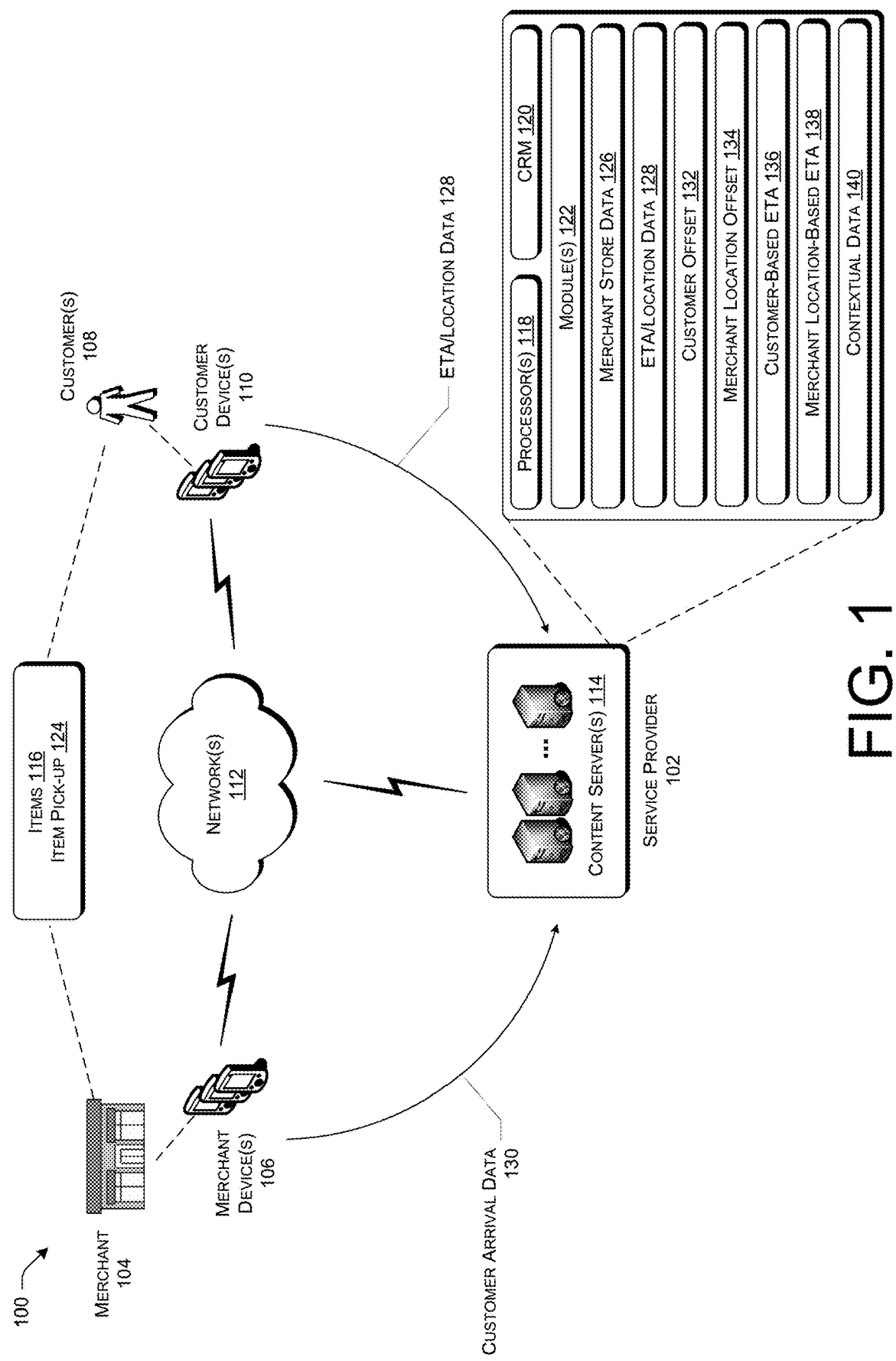
FIG. 1 illustrates an example system for generating a customer-based ETA and/or a merchant location-based ETA with respect to a customer in transit to a merchant location.

Described herein are systems and/or processes for determining a customer-based estimated time of arrival ("ETA") and/or a merchant location-based ETA for a customer in transit to a merchant location. The customer-based ETA and/or the merchant location-based ETA may be based on an offset that corresponds to a difference between an ETA for customers that previously traveled to merchant locations and actual arrival times of the customers at the merchant locations. In various embodiments, a service provider may receive orders for items (e.g., food items) that are fulfilled by merchants (e.g., a grocery store merchant). Although the items may be delivered to customers that place the orders for the items, the customers may also have the option to pick up the items at a merchant location of the merchant (e.g., a physical grocery store or pick-up location). The service provider may identify a time slot/period for the customer to pick up the ordered items, or the customer may be provided with options to select a particular time slot/period for pick-up. Ordering of the items and/or the selection or assignment of the time slot/period may be performed using a mobile application or website that is associated the service provider and that is accessible via customer devices of customers.

In particular, using one or more sensors (e.g., location sensor, accelerometer, etc.) of a customer device (e.g., a mobile telephone) of the customer, the systems and/or processes described herein may estimate when the customer is likely to arrive at the merchant location at which the customer is schedule to pick up items that he/she previously ordered. In some instances, when the customer begins traveling or initiates travel to the merchant location to pick up the ordered items, the customer may send an indication to the service provider. For example, the customer may select an "on my way" button via the mobile application. In some instances, upon receiving this indication, the service provider may send instructions to the merchant location to pick and/or assemble the items included in the customer's order. Moreover, during travel to the merchant location, the service provider may obtain, or the customer device may provide, location data that indicates a current location of the customer device and/or ETA data that indicates when the customer is likely to arrive at the merchant location. Provided that the location data is provided, the service provider may calculate the ETA of the customer. The ETA of the customer may be received or calculated continuously or periodically while the customer is in transit to the merchant location, resulting in multiple data points that indicate a predicted arrival time of the customer as the customer travels closer to the merchant location.

However, the actual arrival time of a customer at a merchant location may not always align with the ETA that is determined by the customer device and/or the service provider. For instance, the customer may arrive at the merchant location prior to the ETA, which may result from a driving behavior of the customer, such as the customer taking a short-cut, driving faster than the speed limit, and so on. The customer may also arrive at the merchant location at a time subsequent to the ETA, which may result from an increased amount of traffic, the customer traveling slower than the speed limit, the customer navigating through a parking lot at the merchant location, etc. Based on data relating to customers and various merchant locations, the service provider may generate a refined, and more accurate, ETA for a customer that is in transit to a particular merchant location.

For instance, the service provider may determine a refined customer-based ETA for the customer that is in transit to a merchant location. For instances in which the customer traveled to a merchant location, the service provider may determine a customer offset that corresponds to a difference in time between a determined ETA for the customer with respect to the merchant location and an actual arrival time of the customer at the merchant location. The customer offset may indicate that the customer arrived 30 seconds before the ETA, 45 seconds after the ETA, and so on. The customer offsets for the customer may be stored in association with a customer profile/account of the customer and may be used to determine a customer-based ETA for subsequent instances in which the customer travels to a merchant location, possibly to pick up items. For instance, the ETA for the customer in transit to a merchant location may be adjusted upwards or downwards (e.g., from 4:56 pm to 4:54 pm or 4:57 pm) based on previous customer offsets in order to generate a refined, and more accurate, customer-based ETA. The customer-based ETA may reflect behavior of the customer while the customer is in transit to merchant locations, such as whether the customer drives over or under the speed limit, whether the customer takes short-cuts, whether the customer stops along the way to a merchant location, whether the customer travels along, or deviates from, a route specified by his/her customer device, and so on.

The service provider may also determine a refined merchant location-based ETA for a customer that is in transit to a particular merchant location. For instances in which customers traveled to that merchant location, the service provider may determine a merchant location offset that corresponds to a difference in time between a determined ETA for the customers with respect to the merchant location and actual arrival times of the customers at the merchant location. The merchant location offset may indicate that, on average, customers arrived at the merchant location prior to, around the same time as, or after the ETA determined for the customers. The merchant location offsets for the merchant location may be stored in association with the merchant location and may be used to determine a merchant location-based ETA for subsequent instances in which customers travel to the merchant location, possibly to pick up items. For instance, the ETA for customers in transit to the merchant location may be adjusted upwards or downwards (e.g., from 4:56 pm to 4:54 pm or 4:57 pm) based on previous merchant location offsets in order to generate a refined, and more accurate, merchant location-based ETA. The merchant location-based ETA may reflect an additional amount of time it generally takes customers to travel to an area designated for picking up items once the customers arrive at the merchant location. This amount of time may represent the time in customers spent driving through a parking lot to a designated pick-up area once the customers entered the parking lot. The merchant location offset may be larger for merchant locations having large parking lots and/or more congestion.

In some embodiments, the generic ETA calculated for a customer with respect to a merchant location may be modified based on a combination of the customer offsets and the merchant location offsets. Moreover, the customer-based ETA and/or the merchant location-based ETA may be provided to the customer and/or the merchant location.

FIG. 1 illustrates an example system 100 for determining a customer-based estimated time of arrival ("ETA") and/or a merchant location-based ETA for a customer that is in transit to a merchant location. The customer-based ETA and/or the merchant location-based ETA may be based on an offset that corresponds to a difference between an ETA for customers that previously traveled to merchant locations and actual arrival times of the customers at the merchant locations. As shown in FIG. 1, the system 100 may include a service provider 102, one or more merchants 104, merchant devices 106 associated with the one or more merchants 104, one or more customers 108, and customer devices 110 associated with the customers 108. The service provider 102, the merchant devices 106, and/or the customer devices 110 may communicate via one or more networks 112. As shown, the service provider 102 may include, or be associated with, one or more content server(s) 114.

As stated above and herein, the service provider 102 may provide and/or maintain functionality that allows the service provider 102 to determine when a customer 108 is on his/her way to pick up items 116 from a merchant location of a merchant 104, such as a brick-and-mortar store or pick-up location (also referred to herein as a "physical location," a "store location," or a "physical store location"). When the customer orders items 116 via a mobile application or website associated with the service provider 102, the customer 108 may elect to pick up the items 116 at a merchant location of the merchant 104 (or the service provider 102) that is preparing, providing, assembling, and/or packaging the ordered items 116. When the customer 108 initiates travel to the merchant location to pick up the ordered items 116, the customer 108 may indicate that via the mobile application/website, which causes such information to be transmitted to the content server(s) 114 of the service provider 102. This signal indicates a current location of the customer 108. The customer device 110 and/or the service provider 102 periodically or continuously calculates an ETA of the customer 108, where the ETA indicates an estimated time that the customer 108 will arrive at the merchant location.

Based on the ETA, the service provider 102 may send instructions to the merchant location to begin preparing the ordered items 116 for pick-up, which may include picking the ordered items 116 and/or assembling the ordered items 116. Since the service provider 102 and/or the content server(s) 114 may receive or determine periodic ETA updates for the customer 108 while the customer 108 is in transit to the merchant location, the service provider 102 may send such instructions to the merchant location when the customer 108 is within a threshold distance from, or is within a threshold amount of time from arriving at, the merchant location. In particular, preparing the ordered items 116 for pick-up may include obtaining the ordered items 116 from shelving, a refrigerator, a freezer, etc., and packaging the items 116 in bags or boxes. As a result, the ordered items 116 are ready for pick-up when the customer 108 arrives at the merchant location. This may allow for minimal wait time for the customer 108 once the customer 108 actually arrives at the merchant location. This may also minimize the amount of time spent by individuals at the merchant location to provide the ordered items 116 to the customer 108 once the customer 108 arrives, which may reduce costs of the merchant location. Awareness of the likely arrival time of the customer 108 may also reduce the amount of time that items 116 are waiting to be picked up, which may be important for perishable, refrigerated, and/or frozen items 116.

As stated above, the service provider 102 may receive from the customer device 110, or calculate, an ETA of the customer 108 periodically. If the current ETA of the customer 108 is equal or less than a check-in ETA threshold (e.g., 5 minutes, 10 minutes, etc.), the service provider 102 may automatically check in the customer 108. At that point, an individual (or an automated mechanism) may begin gathering the ordered items 116 for pick-up. Moreover, when it is determined that the current ETA of the customer 108 is equal to or less than an arrival threshold (e.g., 1 minute, 2 minutes, etc.), the service provider 102 may determine that the customer 108 has arrived, or will shortly arrive, at the merchant location. Via an instruction from the service provider 102, or via a device maintained by the merchant location, an individual at the merchant location may greet the customer 108 when he/she arrives, and the ordered items 116 may be provided to the customer 108.

In various embodiments, the service provider 102 may be any entity that offers items 116 (e.g., products, services, food/drink items, etc.) to customers 108 via an electronic store (e.g., a website, a mobile application, etc.) associated with the service provider 102. That is, the customers 108 may access the electronic store via corresponding customer devices 110 for the purpose of searching for, viewing, selecting, acquiring (e.g., purchasing, leasing, renting, borrowing, lending, etc.), etc., items 116. The items 116 may be provided directly by the service provider 102 or may be provided by the service provider 102 on behalf of a different entity, such as the merchants 104. That is, via a website, an electronic store, and/or a mobile application associated with the service provider 102, the customers 108 may place orders for items 116 to be provided by the merchants 104. Alternatively, customers 108 may place orders directly with the merchants 104, such as via a merchant website, a mobile application associated with a merchant 104, etc. In some embodiments, provided that one or more ordered items 116 are to be prepared/provided by a merchant 104, the merchant 104 may prepare/provide the item(s) 116 at one or more physical merchant locations of the merchant 104 (e.g., a warehouse, a retail store, a fulfillment center, etc.). If a merchant 104 is mobile in nature and offers items 116 at different locations at different times (e.g., a food truck), the mobile merchant 104 may prepare/provide the ordered items 116 at their current location, or at a future scheduled location. The ordered items 116 may be delivered to a delivery location associated with the customer 108 (e.g., a residence, a workplace, etc.), or the ordered items 116 may be picked up by the customer 108 at a physical merchant location of the merchants 104.

The merchants 104 may include any entity that provides items 116 (e.g., products, services, etc.) to the customers 108. The items 116 may be offered for sale, lease, rent, etc., via a physical merchant location (e.g., a brick-and-mortar retail store), via a merchant-branded website (and/or a website associated with the service provider 102 or another entity), or via an application that resides on the customer devices 110. The items 116 may be offered by the service provider 102 via a mobile application or website, ordered by the customer 108 via the mobile application/website, and the items 116 may be picked up by the customer 108 at one of one or more merchant locations of the merchant 104. For instance, assuming that a merchant 104 is a grocery store chain having multiple physical grocery stores in a region, the customer 108 may select which physical grocery store that he/she would like to pick up the ordered items 116. In some embodiments, the merchant 104 may be the service provider 102 itself or may be associated with the service provider 102. For instance, the items 116 ordered by the customer 108 via the mobile application/website of the service provider 102 may be picked up at a physical retail location or a physical pick-up location of the service provider 102. Moreover, regardless of whether the physical location is associated with the service provider 102 or a third-party merchant 104, any type of items 116 may be ordered and picked up, including food or drink items 116, flowers, non-food/drink items 116 (e.g., electronics, houseware, clothing, music, videos, etc.), and so on.

Each merchant 104 may have one or more associated merchant devices 106. In some embodiments, a merchant 104 may be associated with multiple merchant devices 106 such that individual employees or representatives of the merchant 104 may operate a merchant device 106 (e.g., handheld device, tablet, terminal, a point-of-sale (POS) system/device, a device to receive payment, etc.). The merchant devices 106 may be used by the merchants 104 to determine the ETA of customers 108, receive instructions from the service provider 102, check in customers 108, identify orders placed by customers 108, identify items 116 that are to be picked up by customers 108, send notifications to customers 108, and so on.

Moreover, the customers 108 may include any person or entity that interacts with the service provider 102 and/or merchants 104 for the purpose of ordering, acquiring, purchasing, picking up, etc., items 116 via the service provider 102 on behalf of the merchants 104. As discussed herein, the customers 108 may include in-store customers 108 that purchase or consume the items 116 provided by the merchants 104 at the current physical location of the merchants 104, or remote customers 108 that order items 116 via the service provider 102 (e.g., the mobile application or website) and travel to the merchant location to pick up the ordered items 116. Provided that an ETA of a customer 108 indicates that he/she will arrive after a closing time of the merchant location, the customer 108 may receive the ordered items 116 via delivery. The customers 108 may interact with the service provider 102 and/or the merchants 104 via corresponding customer devices 110, which may include cellular telephones, tablet devices, laptop computers, desktop computers, gaming consoles, electronic book (eBook) reader devices, GPS devices, and so on. The customer devices 110 may be used by the customer 108 to place an order for items 116, determine a route to the merchant location, determine and/or send location data and/or ETA data to the service provider 102, check in at the merchant location, and so on.

The network(s) 112 may facilitate communications and/or interactions between the content server(s) 114 of the service provider 102, the merchant devices 106, and/or the customer devices 110. The network(s) 112 may facilitate such communications/interactions via any type of network, such as a public wide-area-network (WAN) (e.g., the Internet), which may utilize various different technologies including wired and wireless technologies. Moreover, the content servers 114 may contain any number of servers that are possibly arranged as a server farm. Other server architectures may also be used to implement the content servers 114.

Moreover, the merchant devices 106, the customer devices 110, and/or the content servers 114 may include one or more processors 118 and computer-readable media 120, which is indicated in FIG. 1 as "CRM.". The processor(s) 118 may execute one or more modules 122 and/or processes to cause the merchant devices 106, the customer devices 110, and/or the content servers 114 to perform a variety of functions, as set forth above and explained in further detail in the following disclosure. In some embodiments, the processor(s) 118 may include a central processing unit (CPU), a graphics processing unit (GPU), both CPU and GPU, or other processing units or components known in the art. Additionally, each of the processor(s) 118 may possess its own local memory, which also may store program modules, program data, and/or one or more operating systems.

The computer-readable media 120 may include volatile memory (such as RAM), non-volatile memory (such as ROM, flash memory, miniature hard drive, memory card, or the like), or some combination thereof. The computer-readable media 120 may be non-transitory computer-readable media 120. The computer-readable media 120 may include, or be associated with, the one or more modules 122 that perform various operations associated with the merchant devices 106, the customer devices 110, and/or the content servers 114. In some embodiments, the one or more modules 122 may include or be associated with computer-executable instructions that are stored by the computer-readable media 120 and that are executable by the processor(s) 118 to perform such operations. The merchant devices 106, the customer devices 110, and/or the content servers 114 may also include additional components not listed above that may perform any function associated with the merchant devices 106, the customer devices 110, and/or the content server(s) 114.

Via the mobile application and/or website associated with the service provider 102, the customer 108 may place an order for one or more items 116 that are to be fulfilled by a merchant 104 (or the service provider 102). When placing the order, the service provider 102 may indicate that the items 116 are to be picked up at a merchant location of the merchant 104, or the customer 108 may select a specific merchant location of one or more merchant locations of the merchant 104 for pick-up of the ordered items 116. Provided that a merchant location is to prepare/provide the ordered items 116 for pick-up, the service provider 102 may send order data to a merchant device 106 at that merchant location. The order data may identify the items 116 included in the order, the customer 108 that placed the order, a time slot or period (e.g., 3:00-5:00 pm) for pick-up of the ordered items 116, and any other information that could be used to identify the items 116 at the merchant location for assembly, assemble the ordered items 116, and provide the ordered items 116 when the customer 108 arrives at the merchant location. A customer 108 picking up items 116 from a particular merchant location may be referred to as "item-pick up 124."

In various embodiments, the service provider 102 may maintain, or at least have access to, merchant store data 126 associated with different merchants 104 and/or merchant locations. For a particular merchant 104, the merchant store data 126 may indicate one or more merchant locations, stores, or pick-up locations of the merchant 104, the hours of operation of those merchant locations (indicating when each merchant location is open or closed), an inventory of items 116 at each merchant location, a number of employees at each merchant location at different times, a number of orders that each merchant location is currently processing of fulfilling, and/or a number of orders that each merchant location has yet to process or fulfill. The number of currently processed orders and the number of unfulfilled orders may indicate a current and future capacity of the merchant locations to fulfill future orders, as well as an estimated wait time for customers 108 when the customers 108 arrive at the merchant locations to pick up ordered items 116. The merchant store data 126 may also include information regarding a layout of different merchant locations, corresponding parking lots or structures, areas that are designated for item pick-up 124, and so on.

Provided that a customer 108 placed an order for one or more items 116 to be picked up at a merchant location, the customer 108 may indicate when he/she is initiating travel or is traveling to the merchant location to pick up the ordered item(s) 116. This customer pick-up signal may constitute the customer 108 sending a message (e.g., a text message, an e-mail message, a chat message, etc.) to the service provider 102, or the customer 108 indicating that he/she is leaving to travel to the merchant location via the mobile application/website of the service provider 102. Either concurrently with placement of the order, or at a subsequent time, the customer 108 may press a button indicating that he/she is traveling to the merchant location to pick up the ordered items 116 (e.g., an "on my way" button). Accordingly, the customer pick-up signal may indicate to the service provider 102 and/or the merchant location that the customer 108 intends to pick up the ordered items 116.

Upon receiving the customer pick-up signal, the service provider 102 may receive, from the customer device 110 of the customer 108, location data (e.g., GPS data) indicating a current location of the customer 108. As will be described in additional detail herein, based on the current location of the customer 108, the geographic location of the merchant location, a scheduled route between the current location of the customer 108 and the geographic location of the merchant location, and possibly other factors (e.g., current weather conditions, current traffic conditions, a mode of transportation of the customer 108, etc.), the service provider 102 may determine/calculate an ETA that indicates a time at which the customer 108 is expected to arrive at the merchant location. The location data of the customer 108 and/or the ETA may also be referred to herein as "ETA/location data 128." In other embodiments, the ETA/location data 128 may be received directly from the customer device 110. For instance, a mobile application residing on the customer device 110 (e.g., a maps application) may determine the ETA with respect to the merchant location and send corresponding ETA/location data 128 to the service provider 102.

The service provider 102 may determine or receive an ETA of the customer 108 on a periodic basis (e.g., every second, every 30 seconds, every minute, every 2 minutes, etc.) while the customer 108 is in transit to the merchant location. In other instances, the ETA/location data 128 may be received or determined by the service provider 102 once the customer 108 is within a threshold distance from, or is less than a threshold amount of time from, the merchant location. In either instance, the service provider 102 may be aware of the likely time of arrival of the customer 108 (e.g., a predicted time in which the customer 108 is to arrive at the merchant location) as the customer 108 is traveling closer and closer to the merchant location.

As stated above, an ETA of a customer 108 that is in transit to a merchant location may be received and/or determined by the service provider 102. The service provider 102 may also receive or determine customer arrival data 130 associated with the customer 108. The customer arrival data 130 may indicate that the customer 108 has in fact arrived at the merchant location, such as the customer 108 arriving at an area designated to pick up ordered items 116. The customer arrival data 130 may also indicate a time at which the customer 108 arrived at the merchant location. For instance, the customer arrival data 130 sent from the merchant device 106 at the merchant location to the content server(s) 114 may include a corresponding timestamp. In some embodiments, and as discussed in additional detail herein, the customer arrival data 130 may be representative of one or more devices (e.g., proximity sensors, cameras, etc.) detecting the customer 108 upon arrival, determining an arrival of the customer 108 based on stop events of the customer 108 while the customer 108 is in transit to the merchant location, an individual/associate at the merchant location greeting or checking in the customer 108, and so on. Upon occurrence of any of the foregoing instances, the customer arrival data 130 may be sent to the content server(s) 114. In any event, the customer arrival data 130 indicates that the customer 108 has in fact arrived at the merchant location.

Accordingly, for a particular customer 108 and a specific merchant location, the service provider 102 may determine a generic ETA and an actual arrival time of the customer 108 at the merchant location. The service provider 102 may determine a difference between these two times, which may be referred to herein as an "offset" and that can constitute seconds or even minutes. A customer offset 132 may be determined for a particular customer 108 that has previously traveled to one or more merchant locations. For instance, the customer offset 132 may indicate that the customer 108 typically arrives at merchant locations prior to, at around the time as, or subsequent to the previously determined ETAs for that customer 108. The customer offset 132 may be specific to different merchant locations. For instance, the customer offset 132 for a first merchant location (e.g., 30 seconds early) may be different than the customer offset 132 for a second, different merchant location (e.g., 42 seconds late). The customer offset 132 may also be an average amount of time in which the customer 108 arrives before or after ETAs that are determined for that customer 108. In various embodiments, the difference between the ETAs and arrival times for a customer 108 may be based on their driving behavior, such as whether the customer 108 drives at, above, or below the speed limit, whether the customer 108 typically takes shortcuts, whether the customer 108 makes stops while in transit to a merchant location and so on.

In some instances, the customer offset 132 may be based on other data known about the customer 108. Such data may include types of products purchased by the customer 108, which may indicate a driving behavior of the customer 108. For instance, the customer 108 may have searched for, viewed, selected, added to a saved items list, purchased, etc., items 116 via a website or mobile application associated with the service provider 102. Customer interaction with certain items 116, such as driving gloves, high performance tires, memorabilia or merchandise relating to sports cars or car racing, etc., may indicate that the customer 108 is likely to drive faster than the average customer 108 or that the customer 108 may drive greater than the speed limit. On the other hand, purchase of items 116 such as child items 116 (e.g., car seats, baby toys, etc.) may indicate that the customer 108 is more cautious and may drive slower than the speed limit.

Moreover, the service provider 102 may determine a merchant location offset 134 for a particular merchant location. The merchant location offset 134 may correspond to a difference in ETAs and arrival times for customers 108 that have previously traveled to that merchant location. For instance, the merchant location offset 134 may indicate that customers 108 typically arrive at the merchant location prior to, at around the time as, or subsequent to the previously determined ETA for those customers 108. As opposed to the customer offset 132 being associated with an individual customer 108, the merchant location offset 134 is specific to a particular merchant location. For instance, the merchant location offset 134 may correspond to an average amount of time in which customers 108 arrive at the merchant location before or after the ETAs determined for those customers 108. The merchant location offset 134 may result from customers 108 navigating through a parking lot or parking structure prior to arriving at an area designated for item pick-up 124, or customers 108 experiencing traffic or waiting for pedestrians while traveling through a parking lot/ structure. In some instances, the ETA may correspond to the customer 108 arriving at an entrance to a parking lot of the merchant location, and it may take the customer 108 seconds or minutes to travel to a designated pick-up area. Accordingly, the merchant location offset 134 may vary for different merchant locations.

The service provider 102 may determine a customer-based ETA 136 based on the customer offset 132. For instance, for a customer 108 that is in transit to a merchant location, the customer device 110 and/or the service provider 102 may determine a ETA for the customer 108 with respect to that merchant location. Provided that the service provider 102 has previously determined a customer offset 132 for that customer 108, the customer offset 132 may be applied to the generic ETA in order to generate the customer-based ETA 136. The ETA determined or sent by the customer device 110 may be considered a "generic" ETA because it likely does not consider various factors that impact the likely arrival time of the customer 108, such as behavior typically exhibited by different customers 108 and/or information about the specific merchant location in which the customer 108 is traveling to (e.g., location of entry point, size of parking lot or structure, traffic/congestion in parking lot/structure, etc.). For instance, if the customer 108 typically arrives at merchant locations 30 seconds prior to the generic ETA, the customer offset 132 of 30 seconds will be subtracted from the generic ETA to determine the customer-based ETA 136 (e.g., generic ETA−customer offset (30 seconds)=customer-based ETA). If the customer 108 typically arrives an amount of time after the generic ETA, the customer-based ETA 136 may be determined by adding that amount of time to the generic ETA.

Moreover, the service provider 102 may determine a merchant location-based ETA 138 based on the merchant location offset 134. For instance, for customers 108 that are in transit to a particular merchant location, the customer device 110 and/or the service provider 102 may determine an ETA for those customers 108 with respect to that merchant location. Provided that the service provider 102 has previously determined a merchant location offset 134 for that merchant location, the merchant location offset 134 may be applied to the generic ETA in order to generate the merchant location-based ETA 138. For instance, if customers 108 typically arrive at the merchant location 30 seconds prior to the generic ETA, the merchant location offset 134 of 30 seconds will be subtracted from the generic ETA to determine the merchant location-based ETA 138 (e.g., generic ETA−merchant location offset (30 seconds)=merchant location-based ETA). However, if customers 108 typically arrive at the merchant location an amount of time after the generic ETA, the merchant location-based ETA 138 may be determined by adding that amount of time to the generic ETA. In the latter example, adding the merchant location offset 134 to the generic ETA may correspond to customers 108 typically arriving at a designated pick-up area of the merchant location after the generic ETA, possibly due to the customers 108 navigating through a parking lot or structure and/or experiencing traffic or other delays (pedestrians) while navigating through the parking lot/structure.

In certain embodiments, a combination of the customer offset(s) 132 and the merchant location offset(s) 134 may be used to generate a refined ETA for a customer 108 that is in transit to a merchant location. Furthermore, the service provider 102 may determine and/or maintain contextual data 140 regarding the customer offsets 132 and/or the merchant location offsets 134. In particular, the service provider 102 may identify various factors that impact whether a customer 108 arrives at a merchant location before or after the determined, generic ETA. Such factors may include time of day, day of the week, time of year, traffic conditions, weather conditions, and so on. These factors may impact the customer offsets 132 for customers 108 and the merchant location offsets 134 for merchant locations, and the offsets may vary based on which factors are present.

Figure 2:
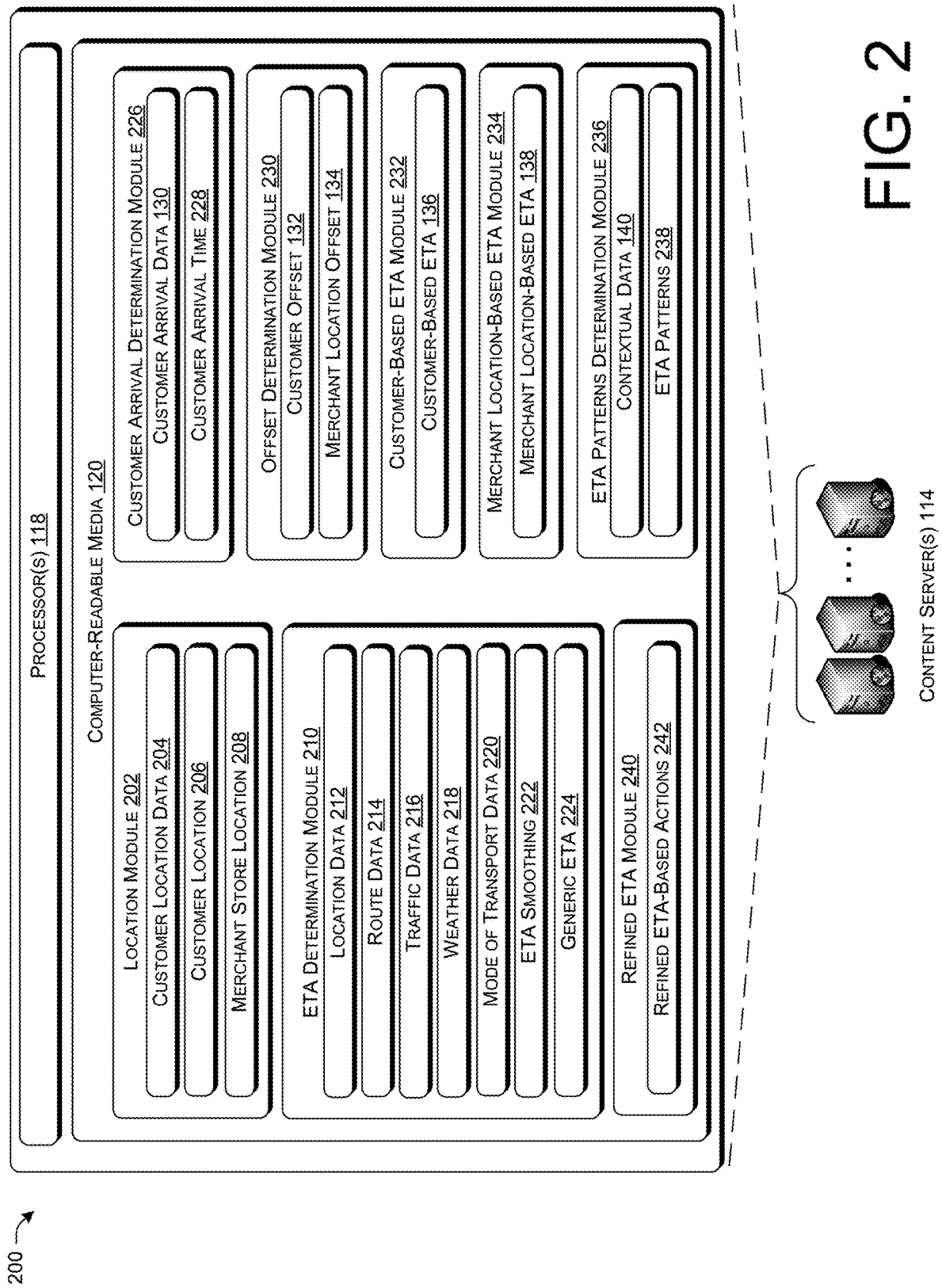
FIG. 2 illustrates an example content server that generates a customer-based ETA and/or a merchant location-based ETA with respect to a customer in transit to a merchant location.

FIG. 2 illustrates an example system 200 that depicts the content server(s) 114 illustrated in FIG. 1. As shown, the content server(s) 114 includes the one or more processor(s) 118, the computer-readable media 120, and various modules 122. In some embodiments, the service provider 102 may determine a customer-based ETA 136 and/or a merchant location-based ETA 138 for a customer in transit to a merchant location. The customer-based ETA 136 and/or the merchant location-based ETA 138 may be based on an offset that corresponds to a difference between an ETA for customers that previously traveled to merchant locations and actual arrival times of the customers at the merchant locations.

The service provider 102 may desire to determine an accurate ETA for a customer 108 with respect to a merchant location, so that the items 116 ordered by the customer 108 are ready to be picked up when the customer 108 arrives. Typically, ETAs determined by customer devices 110, web sites, mobile applications, etc., do not consider various factors that can significantly impact an arrival time of the customer 108. This generic ETA merely calculates the quickest route between a first location (e.g. a current location of the customer 108) and a second location (e.g., a merchant location). The generic ETA may indicate a likely time or arrival or a likely travel time and may also consider current or expected traffic conditions. However, this generic ETA does not consider information about the specific location that the customer 108 is traveling to, as well as information or behavior previously exhibited by the customer 108. As a result, the generic ETA determined for the customer 108 is likely to be inaccurate, which may result in items 116 to be picked up by the customer 108 not being ready when the customer 108 arrives at the merchant location.

Since a customer 108 placed an order for one or more items 116 via the service provider 102, the service provider 102 is aware of the particular merchant location in which the customer 108 is to pick up the ordered items 116. As a result, the service provider 102 is aware of the destination location, and potentially the layout of the merchant location, the corresponding parking lot/structure, and entry point or entrance to the merchant location/parking lot, and so on. Based on information about the merchant location, the service provider 102 may generate a more refined and accurate ETA (e.g., the merchant location-based ETA 138) for a customer 108 that is in transit to that merchant location. In some instances, the generic ETA may correspond to an address of the merchant location, which may correspond to an entry point to a parking lot/structure. However, the generic ETA likely does not consider the additional amount of time that corresponds to the customer 108 traveling through the parking lot/structure in order to arrive at a designated pick-up area. That is, the generic ETA may indicate when the customer 108 turns into a parking lot, but does not consider the amount of time the customer 108 spends navigating through the parking lot and parking. The service provider 102 will consider this additional time and add the additional amount of time to the generic ETA in order to determine a more refined/accurate merchant location-based ETA 138. Since the layout of different merchant locations vary based on size, accessibility, parking lots/structure, the merchant location-based ETA 138 will vary and be specific to each merchant location.

The service provider 102 may maintain information/data about customers 108 as well. Since a particular customer 108 may place multiple pick-up orders via the service provider 102, and pick up the ordered items 116 from different merchant locations, the service provider 102 may determine and analyze a behavior of the customer 108 over time. Based on the generic ETAs calculated for that customer 108 and the actual arrival times of that customer 108, the service provider 102 may determine that the customer 108 is consistently late, early, or on time, compared to the generic ETA. Based on this, the service provider 102 may infer that the customer 108 typically travels at, below, or above the speed limits, typically takes shortcuts, typically deviates from a route specified for the customer 108, etc. For a customer 108 that typically arrives prior to the generic ETA, the service provider 102 may check in that customer 108 earlier and instruct the merchant location to begin preparing/assembling the ordered items 116 at an earlier time so that they are ready for the customer 108 when he/she arrives. Accordingly, the service provider 102 may take the generic ETA and improve its accuracy by considering information/data about the customer 108 and/or the merchant location.

In various embodiments, the computer-readable media 120 may include a location module 202. As described with respect to FIG. 1, the service provider 102 may receive, from customer devices 110 of customers 108, orders for items 116 to be picked up from a particular merchant location. The service provider 102 may also maintain, or at least have access to merchant store data 126 associated with one or more merchant locations. For instance, via a website or mobile application associated with the service provider 102, a customer 108 may shop and place an order for food items 116 to be provided by a grocery merchant 104 that has multiple store locations. Instead of having the food items 116 delivered, the customer 108 may select one of the store locations to pick up the ordered food items 116, as well as a time period/slot (e.g., 3:00-5:00 pm) at which the customer 108 is scheduled to pick up the food items 116. While placing the order, or at a later time, the customer 108 may indicate that he/she is leaving to pick up the ordered items 116 (e.g., the customer pick-up signal), meaning that the customer 108 is beginning to travel to the merchant location. As stated herein, the customer pick-up signal may result from the customer 108 sending an e-mail message, a text message, a chat message, possibly via the mobile application/website, or from the customer 108 selecting a button or other selectable option via the mobile application/web site.

Upon determining that the customer 108 is traveling to the merchant location to pick up the ordered items 116, the location module 202 may determine or receive customer location data 204 associated with the customer device 110 of the customer 108. The customer location data 204 may be GPS data and may indicate a current customer location 206 of the customer 108. The customer location data 204 may be obtained via the mobile application of the service provider 102 or by one or more sensors (e.g., location sensor, GPS sensor, etc.) of the customer device 110. Provided that the customer 108 is currently traveling to the merchant location, the customer location data 204 and the corresponding current customer location 206 will change over time. In other embodiments, the customer location data 204 can be obtained and/or received from the customer device 110 at any time, including when the customer 108 opens and/or interacts with the mobile application used to place orders, when the customer 108 selects a merchant 104 in which he/she would like to order items 116 from, when the customer 108 selects a merchant location of the merchant 104 at which to pick up the items 116, when the customer 108 places the order, and/or when the customer 108 indicates that he/she is initiating travel to the merchant location. In various embodiments, the customer location data 204 will not be collected by the customer device 110 or the mobile application, and will not be sent to the service provider 102, the merchant 104, and/or the merchant location unless the customer 108 first opts in to (e.g., agrees to) the collection and sharing of such customer location data 204.

In addition to maintaining merchant store data 126 associated with different merchant locations, the location module 202 may also maintain, or at least have access to, merchant store location 208. The merchant store location 208 may identify the geographic locations of different merchant locations at which customers 108 may pick up items 116 included in an order. The merchant store location 208 may include addresses of the merchant locations, directions to the merchant locations, description of the surrounding areas, information about parking lots/areas at the merchant locations, areas at the merchant location where items 116 are designated for pick-up by customers 108 (e.g., designated parking spaces/areas, drive-thru areas, etc.), and so on.

The computer-readable media 120 may also include an ETA determination module 210. In some embodiments, the customer device 110 of the customer 108, or a mobile application residing on the customer device 110 (e.g., a maps application), may determine a generic ETA 224 for the customer 108 with respect to the merchant location at which the customer 108 is to pick up his/her ordered items 116. The customer device 110 may send the generic ETA 224 to the content server(s) 114 of the service provider 102, or the service provider 102 may collect the generic ETA 224 from the customer device 110. The generic ETA 224 may be sent by the customer device 110 periodically while the customer 108 is in transit to the merchant location, such that the service provider 102 is aware of the likely arrival time of the customer 108 at the merchant location in real-time (or near real-time). Therefore, in this embodiment, the customer device 110, or a mobile application residing thereon (e.g., a maps application, a mobile application associated with the service provider 102, etc.), may compute and send the generic ETA 224 of the customer. For the purposes of this discussion, the generic ETA 224 may correspond to an ETA that does not consider or factor in various information about customers 108 and/or merchant locations that are maintained by the service provider 102.

In other embodiments, the service provider 102 may determine the generic ETA 224 of the customer 108 as the customer 108 is in transit to the merchant location. Here, the service provider 102 may determine, receive, and/or collect/obtain location data 212 (e.g., raw GPS data). The location data 212 may correspond to the customer location 206, which may indicate a current location of the customer device 110, which may indicate a current location of the customer 108. Moreover, the location data 212 may consider or indicate a velocity/speed or acceleration of the customer 108 as the customer 108 is in transit to the merchant location, as well as a change in velocity/speed or a change in acceleration. The location data 212 may also correspond to a physical location of the merchant location (e.g., the merchant store location 208) at which the customer 108 is to pick up the ordered items 116. As stated herein, the merchant store location 208 may include an address of the merchant location, a description of the surroundings of the merchant location, directions to the merchant location, and so on. Accordingly, the ETA of the customer 108 may be based on the initial location when the customer 108 indicates that he/she is on his/her way to the merchant location, a current location of the customer 108, and/or a physical location of the merchant location.

The ETA may also be based on route data 214. The route data 214 may correspond to a route that the customer 108 is taking, and/or a route that the customer is scheduled to take, with respect to the customer 108 traveling to the merchant location. The route data 214 may be determined by the service provider 102 and/or by a mobile application that resides on the customer device 110, which may be associated with the service provider 102 or a third-party entity. The ETA may also consider traffic data 216 and/or weather data 218. In particular, data indicating traffic along the route taken by the customer 108 to the merchant location may impact the ETA of the customer 108. For instance, an increased amount of traffic along the route and/or near the merchant location may cause the customer 108 to travel to the merchant location at a slower rate, which may result in an increased ETA. However, if the customer 108 is traveling to the merchant location during the night (e.g., 2:00 am), a decreased amount of traffic may be experienced and the ETA may decrease. Moreover, inclement weather or road conditions (e.g., rain, snow, ice, etc.) and/or the customer 108 traveling to the merchant location when it is dark (e.g., the evening, nighttime, early morning, etc.) may cause an increased ETA. In various embodiments, the traffic data 216 may be based on the time of day in which the customer 108 is traveling, such as during rush hour (e.g., 7:00-9:00 am and 4:00-6:00 pm).

The ETA may also be calculated based on historical data, such as historical traffic data 216 and/or historical weather data 218. For instance, the generic ETA 224 may be determined based on previous traffic conditions on a route that the customer 108 is scheduled to take to the merchant location, or previous traffic conditions near the merchant location. Time of day (e.g., rush hour, late at night, etc.) or time of year (e.g., winter) may also be considered when calculating the generic ETA 224.

In some instances, the generic ETA 224 may be determined once the current location of the customer 108 is determined. For instance, since the service provider 102 is aware of the physical locations of the various merchant locations, the customer device 110 and/or the service provider 102 may determine the generic ETA 224 to a merchant location based on the current location of the customer 108. The generic ETA 224 may be received, determined, or calculated once the customer 108 selects a specific merchant location at which the customer 108 desires to pick up items 116, and such a selection may occur before the customer 108 actually places an order for the items 116. Based on the generic ETA 224 to a single merchant location, or possibly multiple different merchant locations, the service provider 102 may advise the customer 108 as to which merchant location the customer 108 should pick up the items 116. The service provider 102 may also recommend a time slot/period that the customer 108 should pick up the ordered items 116 based on the generic ETA 224 to a particular merchant location. This may be based on current or expected traffic/weather conditions, an availability of different merchant locations to fulfill orders, and so on.

In certain embodiments, the generic ETA 224 for the customer 108 may be calculated based on mode of transport data 220. In particular, the customer 108 may travel to the merchant location in one of many ways, such as using a car, a bicycle, running, walking, public transportation (e.g., a bus, train, etc.), and so on. The generic ETA 224 for the customer 108 will likely vary based on the particular mode of transportation that the customer 108 is currently using. For instance, a generic ETA 224 when the customer 108 is driving will likely be significantly less that a generic ETA 224 when the customer 108 is walking or riding a bicycle. The mode of transportation currently being used by the customer 108 may be identified by the customer 108, such as via the mobile application when the customer 108 places the order or indicates that he/she is on his/her way. In other embodiments, the mode of transportation may be inferred by the service provider 102 based on a customer profile of the customer 108 or a past or current velocity in which the customer 108 has/is traveling.

As described herein, while the customer 108 is traveling to a particular merchant location, the customer device 110 may calculate a generic ETA 224 with respect to that merchant location at periodic or random intervals. Similarly, the service provider 102 may calculate the generic ETA 224. In either scenario, the service provider 102 may have access to multiple data points that indicate a generic ETA 224 of the customer 108, where each data point corresponds to a current location of the customer 108/customer device 110 and a particular time in which the current location was captured while the customer 108 is traveling to the merchant location. However, some of the ETA data points may be inaccurate, or may deviate from other ETA data points that have been collected. Based on continuous monitoring of the generic ETA 224 of the customer 108 and obtaining multiple data points, inaccurate or deviating data points may be disregarded or eliminating using ETA smoothing 222 in order to arrive at the generic ETA 224.

In particular, GPS data, for instance, may indicate a current location of the customer 108 that is not entirely accurate. This may result from a poor network connection or signal associated with the customer device 110, or for different reasons. For example, the GPS data may indicate that the customer 108 is traveling on a road that the customer 108 is not currently traveling on. The road may be adjacent or parallel to the road currently being traveled by the customer 108, or may correspond to an overpass or underpass that intersected the road at which the customer 108 is or was located. Inaccurate or incorrect location data of the customer 108 may result in an inaccurate or incorrect generic ETA 224 with respect to the merchant location. The generic ETA 224 may be artificially increased or decreased based on the inaccurate or incorrect location data, and such inaccurate/incorrect location data points may deviate significantly from proximate location data points. For instance, a first location data point at a first time and a third data location point at a second time may indicate that the customer 108 is traveling on a highway, and a third location data point captured at a third time between the first time and the second time may indicate that the customer 108 is traveling on a different road (e.g., not the highway). This outlier location data point that may significantly deviate from proximate location data points may cause a vastly different ETA. For instance, the ETA at the first time may be 14 minutes, the ETA at the second time may be 13 minutes, and the ETA at the third time, which is based on the incorrect/inaccurate location data point, may be 22 minutes.

In certain embodiments, the ETA smoothing 222 may disregard or eliminate ETA data points that indicate that the customer 108 will likely not arrive at the merchant location prior to a closing time of that merchant location, when other ETA data points indicate that the customer 108 will in fact arrive at the merchant location prior to the closing time. The outlier ETA data point may be a single ETA data point, or may be multiple ETA data points collected/obtained while the customer 108 is traveling to the merchant location. In some instances, outlier ETA data points may be disregarded or filtered out when a threshold number of ETA data points associated with the customer 108 traveling to the merchant location have been obtained/calculated. The threshold number may be any number, such as five ETA data points, ten ETA data points, and so on. For example, provided that the threshold number is ten ETA data points collected while the customer 108 is traveling to the merchant location, assume that fifteen ETA data points indicate that the customer 108 will likely arrive at the merchant location prior to the closing time, and a single ETA data point indicates that the customer 108 will likely arrive after the closing time. These ETA data points may be smoothed by eliminating, disregarding, or filtering out the outlier ETA data point that indicates that the customer 108 will likely arrive after the closing time of the merchant location.

Using the example in the preceding paragraph, the ETA smoothing 222 may utilize one or more algorithms to filter out outlier ETA data points. For instance, and as discussed above, outlier ETA data points may be filtered out or disregarded if the ETA data points are equal to or greater than a threshold variation from proximate ETA data points. Moreover, ETA data points that are determined to be outliers may be maintained or considered if a sufficient amount of non-outlier ETA data points have been obtained or calculated. In this embodiment, for instance, a threshold number of outlier ETA data points may be maintained or considered for every certain number of non-outlier ETA data points, such as one outlier ETA data point per every ten or twenty non-outlier ETA data points.

Upon performing the ETA smoothing 222 on the ETA data points with respect to the customer 108 traveling to the merchant location, the service provider 102 may determine the generic ETA 224 with respect to the customer 108 and the merchant location. The generic ETA 224 may be calculated or received at any point during travel of the customer 108 to the merchant location, and the generic ETA 224 may represent a time that the customer 108 is expected to arrive at the merchant location. As stated above, the generic ETA 224 may be based on numerous factors, such as the physical geographic location of the merchant location, the current location of the customer 108, the route that the customer 108 is scheduled to take, current or expected traffic conditions, current or expected weather conditions, a mode of transport that the customer 108 is currently using, or is expected to use, and so on.

A customer arrival determination module 226 may maintain the customer arrival data 130 regarding the arrival of customers 108 at merchant locations and determine a customer arrival time 228 that indicates times in which customers 108 arrived at merchant locations. As stated herein, the customer arrival data 130 may indicate that a customer 108 has in fact arrived at a merchant location, such as the customer 108 arriving at an area designated for the pick-up of items 116 (e.g., a parking space, a parking area, a drive-thru area, etc.). The arrival of a customer 108 may be determined in numerous ways. For instance, when the customer 108 arrives, he/she may be greeted by an individual/employee at the merchant location, who may verify the identity of the customer 108 and input data via a merchant device 106 (e.g., a tablet device, a mobile telephone, etc.). The individual may input information about the customer 108 via an application/website associated with the service provider 102. In other embodiments, the customer arrival data 130 may correspond to the customer 108 checking in upon arrival via his/her customer device 110, possibly via a website or mobile application associated with the service provider 102 or the merchant 104. Self-service check in by the customer 108 may also be performed via a merchant device 106 at the merchant location.

The customer arrival data 130 may also correspond to one or more devices at the merchant location detecting an arrival of the customer 108. For instance, a proximity sensor may detect the customer 108 and/or his/her vehicle. In other embodiments, one or more cameras (e.g., still image cameras, video cameras, etc.) may capture images and/or video that depict the customer 108 and/or a vehicle of the customer 108. Analysis of the images/video may allow the service provider 102 to verify an identity of the customer 108. For instance, a license plate of the vehicle or other identifying information depicted in the image/video may be compared to corresponding information stored in a user account/profile of the customer 108. In other embodiments, the arrival of the customer 108 may be determined without using such hardware/infrastructure, such as the service provider 102 determining stop events of the customer 108 while the customer 108 is in transit to the merchant location. The last detected stop event may correspond to the customer 108 arriving at the merchant location, or an area designated for customers 108 to pick up items 116 from the merchant location. Such infrastructure-free arrival detection techniques are described in U.S. patent application Ser. No. 16/057,430 (filed on Aug. 7, 2018 and entitled "Sensor-Based Customer Arrival Detection"), which is incorporated by reference herein in its entirety.

Regardless of how the arrival of the customer 108 at the merchant location is determined, the customer arrival data 130 that is sent by a merchant device 106 at the merchant location, other devices at the merchant location, and/or a customer device 110 of the customer 108, and that is received by the content server(s) 114 may indicate a customer arrival time 228 of the customer 108. For instance, the customer arrival data 130 for a customer 108 with respect to a merchant location may include a timestamp that indicates a specific time at which the customer 108 arrived at the merchant location. As a result, the service provider 102 may be aware of a specific time at which the customer 108 arrived and was present at the merchant location. Accordingly, the service provider 102 may determine and/or maintain a first time at which the customer 108 was expected to arrive at the merchant location (i.e., the generic ETA 224) and a second time at which the customer 108 actually arrived at the merchant location (i.e., the customer arrival time 228).

Furthermore, the computer-readable media 120 may include an offset determination module 230, which may determine the customer offset 132 and/or the merchant location offset 134. For a particular customer 108 that has traveled to a merchant location, the customer offset 132 may correspond to a difference between the generic ETA 224, regardless of whether the generic ETA 224 was determined by the service provider 102 or the customer device 110 of the customer 108, and the customer arrival time 228 of the customer 108 at the merchant location. Accordingly, the customer offset 132 may correspond to an amount of time prior to or after the generic ETA 224. For instance, if the customer 108 was estimated to arrive at a merchant location in five minutes (or 4:41 pm), and the customer 108 actually arrived at the merchant location in 5 minutes and 30 seconds (or 4:40:30), the customer offset 132 would be thirty seconds (+30 seconds). If the customer 108 arrived 30 seconds before the generic ETA 224, the customer offset 132 would be −30 seconds. The service provider 102 may determine a customer offset 132 of the customer 108 for each instance in which the customer 108 travels to a specific merchant location to pick up items 116, or multiple merchant locations. As a result, the service provider 102 may determine whether the customer 108 typically arrives at the merchant location prior to, around the same time as, or after the generic ETA 224 calculated for the customer 108. The customer offsets 132 determined for the customer 108 may be stored in association with a customer profile/account of the customer 108 (or a customer identifier of the customer 108) and an average of the customer offsets 132 of the customer 108 may be determined by the service provider 102.

A positive customer offset 132 (e.g., the customer 108 arriving at the merchant location after the generic ETA 224) may result from behavior of the customer 108, such as the customer 108 driving slower than a speed limit, the customer 108 deviating from a route specified by his/her customer device 110, the customer 108 stopping while in transit to the merchant location, the customer 108 typically traveling in a high-occupancy vehicle (HOV), carpool, or transit lane, inclement weather conditions (e.g., snow, ice, rain, etc.), traffic conditions (e.g., more than an expected amount of congestion), time of day (e.g., rush hour, nighttime, etc.) and so on. A negative customer offset 132 (e.g., the customer 108 arriving at the merchant location prior to the generic ETA 224) may also result from behavior of the customer 108, such as the customer 108 driving faster than a speed limit, the customer 108 taking one or more short cuts, satisfactory weather conditions, traffic conditions (e.g., less than an expected amount of congestion), and so on. However, provided that the service provider 102 is aware of the generic ETA 224 of the customer 108 and the actual arrival time 228 of the customer 108, the service provider 102 may determine the customer offset 132. The service provider 102 need not determine why the customer 108 arrived prior to or after the generic 224, and just the fact that the customer 108 did arrive at the merchant location before or after the generic ETA 224.

In other embodiments, for a particular merchant location, the merchant location offset 134 may correspond to a difference between the generic ETA 224 for customers 108 that traveled to the merchant location and the customer arrival times 228 for those customers 108. Accordingly, the merchant location offset 134 may correspond to an amount of time prior to or after the generic ETA 224 that customers 108 typically arrive at a single merchant location. The merchant location offset 134 may be determined for each customer 108 that traveled to the merchant location to pick up items 116 (or for any other reason), such that the service provider 102 may determine, on average, whether customers 108 typically arrive prior to, around the same time as, or after the generic ETAs 224 calculated for the customers 108. The merchant locations offsets 134 determined for multiple customers 108 that have traveled to the merchant location may be stored in association with the merchant location or a merchant location identifier of the merchant location. A positive merchant location offset 134 (e.g., customers 108 arriving after the generic ETA 224) may result from an additional amount of time customers 108 spend navigating through a parking lot/structure to arrive at a designated area for item pick-up 124, vehicle or pedestrian traffic/congestion within the parking lot/structure, customers 108 locating a parking spot, and so on. A negative merchant location offset 134 may result from customers 108 being able to easily navigate to a designated pick-up area, a greater availability of parking spots, and so on.

The customer offset 132 and/or the merchant location offset 134 may be stored in association with the customer(s) 108 (or customer identifiers(s)) that traveled to the merchant location(s) and/or the merchant location(s) themselves (or merchant location identifier(s)). Moreover, the customer offset 132 and/or the merchant location offset 134 may be stored in association with various contextual factors, such as the time of day in which the customer(s) traveled to the merchant location(s), the day of the week in which the customer(s) traveled to the merchant location(s), the time of year in which the customer(s) traveled to the merchant location(s), and so on. The location/area in which the customer 108 initiated travel to a merchant location (e.g., source location or initial location) may also influence the customer offset 132. For instance, when a customer 108 travels from a particular area that is well known by the customer 108 (e.g., a residence, a workplace, etc.), the customer 108 may be aware of and use different routes or shortcuts that may allow the customer 108 to arrive at the merchant location prior to the generic ETA 224.

In some embodiments, during a particular session or time period (e.g., one hour, two hours, a day, etc.), the service provider 102 may store the offsets for customers 108 that traveled to a merchant location. That is, the service provider 102 may determine a difference in time between the generic ETAs 224 determined for those customers 108 and the actual arrival times 228 of those customers 108. For each offset, the service provider 102 may determine an accuracy of the generic ETA 224. The accuracy of the generic ETA 224 may be with respect to the specific customer 108 that traveled to a merchant location and/or may be with respect to the specific merchant location in which items 116 were picked up.

The computer-readable media 120 may also store a customer-based ETA module 232, which may determine or generate a customer-based ETA 136 for a customer 108 that is in transit to a merchant location based on the customer offset(s) 132 for that customer 108. Calculation of the customer-based ETA 136 may constitute a technological solution to a technological problem since the service provider 102 is able to generate a more refined and accurate ETA as compared to a generic ETA 224 determined by a customer device 110. This refined/more accurate ETA is also specific to the customer 108 based on behavior previously exhibited by the customer 108. In particular, for a customer 108 that is in transit to a merchant location, a generic ETA 224 may be determined for the customer 108. Provided that the service provider 102 has previously determined one or more customer offsets 132 for that customer 108, the service provider 102 may dynamically generate a refined and more accurate customer-based ETA 136 based on the customer offsets 132. For instance, depending on whether the customer offset(s) 132 for the customer 108 is positive (the customer 108 typically arrives after the generic ETA 224) or negative (the customer 108 typically arrives prior to the generic ETA 224), the service provider 102 may determine the customer-based ETA 136 by applying the customer offset(s) 132 to the generic ETA 224. That is, the customer offset(s) 132 may be added to or subtracted from the generic ETA 224 in order to arrive at the customer-based ETA 136. As an illustrative example, if the customer 108 typically arrives at merchant locations one minute after the generic ETA 224, one minute will be added to the generic ETA 224, which will result in the refined and more accurate customer-based ETA 136. On the other hand, if the customer 108 typically arrives at merchant locations one minute prior to the generic ETA 224, one minute will be subtracted from the generic ETA 224, which will result in the refined and more accurate customer-based ETA 136.

In some embodiments, the customer-based ETA 136 for a particular customer 108 that is in transit to a merchant location may be generated by first performing statistical analysis with respect to the previously determined customer offset(s) 132 for that customer 108. For instance, for the customer offsets 132 determined for the customer 108, the service provider 102 may determine an average value, mean value, p50 value, etc., of the customer offsets 132, which may result in a single customer offset 132 value (e.g., +30 seconds, −30 seconds, etc.). This customer offset 132 value may then be applied to a generic ETA 224 that has been determined for the customer 108 with respect to the customer 108 traveling to a merchant location.

The service provider 102 may also apply other types of algorithms to determine the customer offsets 132 and/or customer-based ETA 136 for a customer 108, such as linear regression, trend generating algorithms, machine learning algorithms, and so on. Inputs for such algorithms may include an initial location from which the customer 108 will initiate travel to the merchant location, a physical location of the merchant location, and/or a generic ETA 224 determined for the customer 108 with respect to that merchant location. Additional inputs may include customer offsets 132 of the customer 108 that have been learned over time by the service provider 102. The output of the algorithm(s) may include the customer offset 132 (e.g., +45 seconds, −30 seconds, etc.) that is to be applied to the generic ETA 224 in order to generate the customer-based ETA 136. Based on application of this customer offset 132, the customer-based ETA 136 is likely to vary from, and be more accurate than, the generic ETA 224. In other embodiments, the output from the algorithm(s) may be the customer-based ETA 136 itself.

With respect to the determination of the customer offset 132, the merchant location offset 134, the customer-based ETA 136, and/or the merchant location-based ETA 138, and for the purpose of this discussion, any type of machine learning model/technique, predictive model, and/or other statistical analysis may be used. Examples of predictive models that may be utilized include group method of data handling, Naïve Bayes, k-nearest neighbor algorithm, majority classifier, support vector machines, random forests, boosted trees, Classification and Regression Trees (CART), neural networks, ordinary least square, regression analysis (e.g., linear regression), and so on. Moreover, examples of machine learning techniques may include supervised learning, unsupervised learning, semi-supervised learning, classification analysis, regression analysis, clustering, etc. Moreover, any other types of algorithms may also be used.

In some embodiments, the customer-based ETA 136 and/or the merchant location-based ETA 138 may be determined by first generating and/or maintaining a matrix, database, table, data structure, etc. (hereinafter, "matrix"), that includes the customer offsets 132 and the merchant location offsets 134. For instance, for a particular customer 108, the matrix may include a customer ID of the customer 108 and each customer offset 132 associated with that customer 108, where the customer offsets 132 may be associated with a single merchant location or multiple merchant locations. Moreover, for a particular merchant location, the matrix may include a merchant location ID of the merchant location and each merchant location offset 134 associated with customers 108 that have traveled to the merchant location. The customer offsets 132 and the merchant location offsets 134 may be maintained in association with time of day, day of the week, time of year, weather conditions, traffic conditions, initial location of customer 108, and so on.

Alternatively, or in addition to generating a customer-based ETA 136 for a particular customer 108, a merchant location-based ETA module 234 may generate a merchant location-based ETA 138 for a customer 108 that is in transit to a particular merchant location based on the merchant location offset(s) 134 for customers 108 that have previously traveled to that merchant location. Calculation of the merchant location-based ETA 138 may constitute a technological solution to a technological problem since the service provider 102 is able to generate a more refined and accurate ETA as compared to a generic ETA 224 determined by a customer device 110. Moreover, this refined/more accurate ETA is specific to the merchant location and is based on customers 108 that have previously traveled to that merchant location. In particular, for a customer 108 that is in transit to this merchant location, a generic ETA 224 may be determined for the customer 108. Provided that the service provider 102 has previously determined merchant location offsets 134 for customers 108 that have previously traveled to that merchant location, the service provider 102 may dynamically generate a refined and more accurate merchant location-based ETA 138 based on the merchant location offsets 134. For instance, depending on whether the merchant location offset(s) 134 for previous customers 108 are positive (customers 108 typically arrive at the merchant location after the generic ETA 224) or negative (customers 108 typically arrive at the merchant location prior to the generic ETA 224), the service provider 102 may determine the merchant location-based ETA 138 by applying the merchant location offset(s) 134 to the generic ETA 224. That is, the merchant location offset(s) 134 may be added to or subtracted from the generic ETA 224 in order to arrive at the merchant location-based ETA 138. As an illustrative example, if customers 108 typically arrive at that merchant locations one minute after the generic ETA 224, one minute will be added to the generic ETA 224, which will result in the refined and more accurate merchant location-based ETA 138. On the other hand, if customers 108 typically arrive at the merchant location one minute prior to the generic ETA 224, one minute will be subtracted from the generic ETA 224, which will result in the refined and more accurate merchant location-based ETA 138.

As stated herein, the customer offset 132 and/or the merchant location offset 134 may correspond to an amount of time that is applied to (e.g., added to, subtracted from, etc.) the generic ETA. However, in other embodiments, the offsets described herein may correspond to a percentage or a percentage amount. For instance, based on previous travel of a customer 108 over different segments or to different merchant locations, the service provider 102 may determine that the customer 108 is typically 10% faster than, or arrives 10% earlier than, the average customer 108. For instance, if the generic ETA 224 for that customer 108 is ten minutes, the customer 108 will likely arrive in 9 minutes (e.g., 10% of ten minutes equals one minute). To determine a customer-based ETA 132 for that customer 108, the service provider 102 may apply that percentage to the generic ETA, an estimated travel time, and/or the predicted time that the customer 108 is to arrive at a merchant location or an end location of a particular segment to be traveled by the customer 108. A percentage amount may also be added to, or subtracted from, a generic ETA 224, an estimated travel time, and/or or a predicted amount of travel time for the customer 108.

In some embodiments, the merchant location-based ETA 138 for a particular customer 108 that is in transit to a merchant location may be generated by first performing statistical analysis with respect to the previously determined merchant location offset(s) 134 for customers 108 that previously traveled to that merchant location. For instance, for the merchant locations offsets 132 determined for the merchant location, the service provider 102 may determine an average value, mean value, p50 value, etc., of the merchant location offsets 134, which may result in a single merchant location offset 134 value (e.g., +30 seconds, −30 seconds, etc.). This merchant location offset 134 value may then be applied to a generic ETA 224 that has been determined for a customer 108 that is in transit to that merchant location, possibly to pick up items 116 from that merchant location.

The service provider 102 may also apply other types of algorithms to determine the merchant location offsets 134 and/or merchant location-based ETA 138 for the merchant location, such as linear regression, trend generating algorithms, machine learning algorithms, and so on. Inputs for such algorithms may include an initial location from which the customer 108 will initiate travel to the merchant location, a physical location of the merchant location, and/or a generic ETA 224 determined for the customer 108 with respect to that merchant location. Additional inputs may include merchant location offsets 134 of customers 108 with respect to that merchant location that have been learned over time by the service provider 102. The output of the algorithm(s) may include the merchant location offset 134 (e.g., +45 seconds, −30 seconds, etc.) that is to be applied to the generic ETA 224 in order to generate the merchant location-based ETA 138. Based on application of this merchant location offset 134, the merchant location-based ETA 138 is likely to vary from, and be more accurate than, the generic ETA 224. In other embodiments, the output from the algorithm(s) may be the merchant location-based ETA 138 itself.

In some embodiments, the service provider 102 may maintain data regarding a layout or map of a merchant location and its corresponding parking lot or structure. This layout may indicate an area that is designated for item pick-up 124, ways in which customers 108 may navigate through the parking to the designated pick-up area, an entry point to the merchant location from a street/road, and so on. The service provider 102 may determine merchant location offsets 134 for the merchant location based on the layout/map and location data received from a customer device 110 of a customer 108 that is in transit to the merchant location. For instance, based on the location data and corresponding timestamp data, the service provider 102 may determine a time at which the customer 108 entered the entry point for of the merchant location. The service provider 102 may also determine the arrival time 228 of the customer 108, possibly based on the location data and/or the customer arrival data 130. The merchant location offset 134 may be a difference between the time at which the customer 108 entered the parking lot and the arrival time 228. This difference may constitute the amount of time it typically takes customers 108 to navigate through the parking lot/structure of the merchant location to the designated pick-up area. In some instances, the service provider 102 may track, based on the location data received from the customer device 110, the location of the customer 108 as the customer 108 navigates through the parking lot. Moreover, if the merchant location has multiple designated pick-up areas, the service provider 102 may determine the merchant location offset 134 to each of the designated pick-up areas.

The generic ETA 224 received from the customer device 110 of a customer 108 may only consider the initial or current location of the customer 108, the location of the merchant location, a route between the two locations, and possibly traffic conditions. As a result, the generic ETA 224 does not consider an amount of time it generally takes to travel through the parking lot, an amount of time to travel to a pick-up parking spot, and any additional time corresponding to an amount of time it typically takes to navigate from an entry of the merchant location to an item pick-up 124 location at the merchant location. This data may be due to traffic in a parking lot, a distance from the entry to the pick-up location, waiting for pedestrians in the parking lot, etc. Accordingly, the service provider 102 may generate a modified/refined ETA based on this additional information known about the merchant location, as well as merchant location offsets 134 for customers 108 that have traveled to that merchant location.

In some embodiments, the service provider 102 may determine when a customer 108 is within a threshold distance (e.g., 1 mile) or a threshold amount of time (e.g., 2 minutes, 5 minutes, etc.) from the merchant location. The merchant location offset 134 may then be determined staring at this particular time. The merchant location offset 134 may also be determined starting when the current time is equal to the time indicated by the generic ETA 224 of the customer 108, or when the amount of time remaining until the customer 108 arrives at the merchant location is zero, which is based on the generic ETA 224.

Accordingly, over time, the service provider 102 may determine and maintain offsets specific to individual customers 108 who have previously traveled to different merchant locations and offsets specific to customers 108 who have previously traveled to individual merchant locations. The service provider 102 may also determine and maintain variance in offsets based on the day of the week, times of day, varying weather conditions, varying traffic conditions, and so on. As a result, the service provider 102 may maintain a robust data set relating to travel of customers 108 from different area/locations to various merchant locations at different times of day, different days of the week, varying weather conditions, varying traffic conditions, and so on. Based on these offsets, the service provider 102 may dynamically generate/calculate customer-based ETAs 136 and merchant location-based ETAs 138 based on generic ETAs 224 while a customer 108 is in transit to a merchant location. The offsets used to calculate such customized ETAs may correspond to customers 108 that traveled to a merchant location at the same or a similar time, day, weather conditions, traffic conditions, etc.

In some embodiments, the service provider 102 may determine a refined/customized ETA for a customer 108 that is in transit to a merchant location using a combination of the customer offset(s) 132 associated with that particular customer 108 and the merchant location offsets(s) 134 associated with that specific merchant location. For instance, the customer offset(s) 132 of the customer 108 may be utilized to determine a modified ETA to the entry of the merchant location, and the merchant location offset(s) 134 may be used to determine an additional amount of time to a designated pick-up area/parking spot at the merchant location. For instance, the customer offset 132 of the customer 108 may indicate that the customer 108 typically arrives at merchant locations prior to a generic ETA 224 (e.g., −2 minutes). Moreover, the merchant location offset(s) 134 for the merchant location may indicate that customers 108 typically arrive at the merchant location after the generic ETA 224 (e.g., +1 minute). These two offsets could be combined to arrive at the customized/refined ETA for the customer 108. Since the customer 108 typically arrives at merchant locations two minutes early, and customers 108 typically arrive at the merchant location 1 minute late, the service provider 102 may determine that the customer 108 will likely arrive one minute earlier than the generic ETA 224 with respect to that merchant location. Accordingly, the customized/refined ETA for the customer 108 may be determined by subtracting one minute from the generic ETA 224.

In some instances, the service provider 102 may maintain a greater amount of data regarding customers 108 traveling to a specific merchant location than data regarding the specific customer 108 that is in transit to that merchant location. For instance, a merchant location may provide pick-up services for customers 108 on a daily basis, whereas the customer 108 may have yet to use this service. As a result, the service provider 102 may have a robust set of merchant location offset 134 data for these customers 108, but very little to no customer offset 132 data for that particular customer 108. In this scenario, the service provider 102 may determine the refined ETA for the customer 108 using the merchant location offset(s) 134, or use a combination of the customer offset(s) 132 and the merchant location offset(s) 134, but assign a greater weight to the merchant location offset 134 data. Moreover, if the service provider 102 maintains a more robust set of data regarding merchant location offset(s) 134 for a merchant location, the offset data may be more granular in nature (e.g., two-hour time periods), as opposed to general time of day or day of the week. In other embodiments, if the customer offset 132 data for a customer 108 that is maintained by the service provider 102 is more robust than the merchant location offset 134 data for a merchant location, the customer offset(s) 132 may be instead used, or at least is assigned a higher weight. This may result from a customer 108 extensively using pick-up services from merchant locations and the merchant location offering a new pick-up service.

In certain embodiments, the service provider 102 may determine a customer offset 132 and/or a merchant location offset 134 for a first customer 108 that just arrived at a merchant location, and then apply that one or both of the offsets to a second customer 108 that currently is in transit to the merchant location. The resulting refined ETA for the second customer 108 may indicate real-time weather or traffic conditions along the route specified for the second customer 108 or in an area surrounding the merchant location.

The computer-readable media 120 may also maintain an ETA patterns determination module 236, which may maintain or at least have access to the contextual data 140 and may determine ETA patterns 238 with respect to customers 108 and/or merchant locations. More particularly, the ETA patterns 238 may correspond to variations in customer offsets 132 and/or merchant location offsets 134 in different contexts, such as different times of day, different days of the week, different times of year, varying weather conditions, varying traffic conditions, and so on. For instance, the customer offset 132 for a particular 108 may vary based on whether the customer 108 is traveling during rush hour, during the middle of the day, or at night, is traveling on a weekday versus a weekend, and so on. The ETA patterns 238 may be considered when determining the customer-based ETA 136 and/or the merchant location-based ETA 138 for a customer 108 that is in transit to a merchant location.

A refined ETA module 240 may determine or perform one or more refined ETA-based actions 242. More particularly, in addition to refining a generic ETA 224 for a customer 108 that is in transit to a merchant location, the service provider 102 may take other actions. For instance, based on the customer-based ETA 136 and/or the merchant location-based ETA 138 for a customer 108 that is in transit to a merchant location, the service provider 102 may send, to a merchant device 106 at the merchant location, an instruction to begin assembling items 116 ordered by the customer for pick-up. The service provider 102 may send such instructions when the customer 108 is within a threshold amount of time (e.g., 2 minutes, 5 minutes, 10 minutes, etc.) from arriving at the merchant location, which may be derived from the refined ETA for the customer 108. The instruction(s) may cause an associate/individual at the merchant location to assemble the ordered items 116 so that they are ready for pick-up when the customer 108 arrives. The customer-based ETA 136 and/or the merchant location-based ETA 138 may also be provided to a merchant device 106 of the merchant location, which may allow the merchant location to be aware of the likely arrival time 228 of the customer 108 and to possibly greet, and verify an identity of, the customer 108 when he/she arrives. In other embodiments, the customer-based ETA 136 and/or the merchant location-based ETA 138 may be sent to the customer device 110 of the customer 108 while the customer 108 is in transit to the merchant location. This may allow the customer 108 to be aware of his/her likely arrival time 228 at the merchant location.

For the purposes of this discussion, the service provider 102 may determine the customer offset(s) 132, the merchant location offset(s) 134, the customer-based ETA(s) 136, and/or the merchant location-based ETA(s) 138 regardless if customers 108 are traveling to merchant locations to pick up items 116. The customer 108 may be traveling to merchant locations for any other reason, such as to shop for items 116 in the store, to pick up an individual, to view an appearance of the merchant locations, etc. Accordingly, determination of the offsets and refined ETAs described here may be performed without the pick-up of items 116 from any merchant location.

In some embodiments, the customer offset(s) 132 and/or the merchant location offset(s) 134 may be based on one or more segments previously traveled by a customer 108. For instance, instead of determining the offsets based on customer travel to a particular merchant location, the service provider 102 may determine the offsets based on segments in which the customer 108 traveled from a first location to a second location. The segments may be of any length or duration and may correspond to a portion of a route in which a customer 108 traveled to a merchant location, or any other location. Each segment may have a first beginning/start location and a second end location, which may be determined based sensor data obtained by a customer device 110 of the customer 108 (e.g., location data or geolocation data, such as GPS data). The service provider 102 and/or the customer device 108 may determine a generic ETA 224 for a particular segment. That is, based on a beginning location of the segment and an end location of the segment, the service provider 102 and/or the customer device 108 may predict a time at which the customer 108 is expected to arrive at the end location or an estimated travel time from the beginning location to the end location. In some instances, the beginning location may correspond to an initial location of the customer 108 and/or the end location may correspond to a merchant location.

Based on location data (e.g., GPS data) received from the customer device 108, the service provider 102 may determine a time at which the customer 108 actually arrived at the end location or an actual travel time that corresponds to the customer 108 traveling from the beginning location to the end location. A customer offset 132 for that segment may be calculated based on a difference between the generic ETA 224 and the actual arrival time for that segment, or on a difference between an estimated travel time for the customer 108 to traverse the segment and an actual travel time between the beginning location and the end location. The service provider 102 may determine the customer offset 132 for any segment traveled by the customer 108, including segments that end at a particular merchant location.

Using the systems and processes described herein, the service provider 102 may determine a customer-based ETA 136 for the customer 108 based on the previously determined customer offset(s) 132. The customer-based ETA 136 may be with respect to the customer 108 traveling to a merchant location or a subsequent segment traveled by the customer 108. The subsequent segment may be associated with the segment used to calculate the customer offset(s) 132. For instance, assume that the segment referenced above is a first segment along a route taken by a customer 108. The customer-based ETA 136 may be calculated for a second segment that is along the same route taken by the customer 108. The segment may also correspond to any other segment traveled by the customer 108 at a subsequent time. As a result, information about travel tendencies of a customer 108 (e.g., customer offset(s) 132) may be determined for any segment previously traveled by the customer 108, and that information may be used to determine a refined ETA for any subsequent segment traveled by that customer 108, regardless of whether the customer 108 is traveling to a merchant location or any other location.

Figure 3:
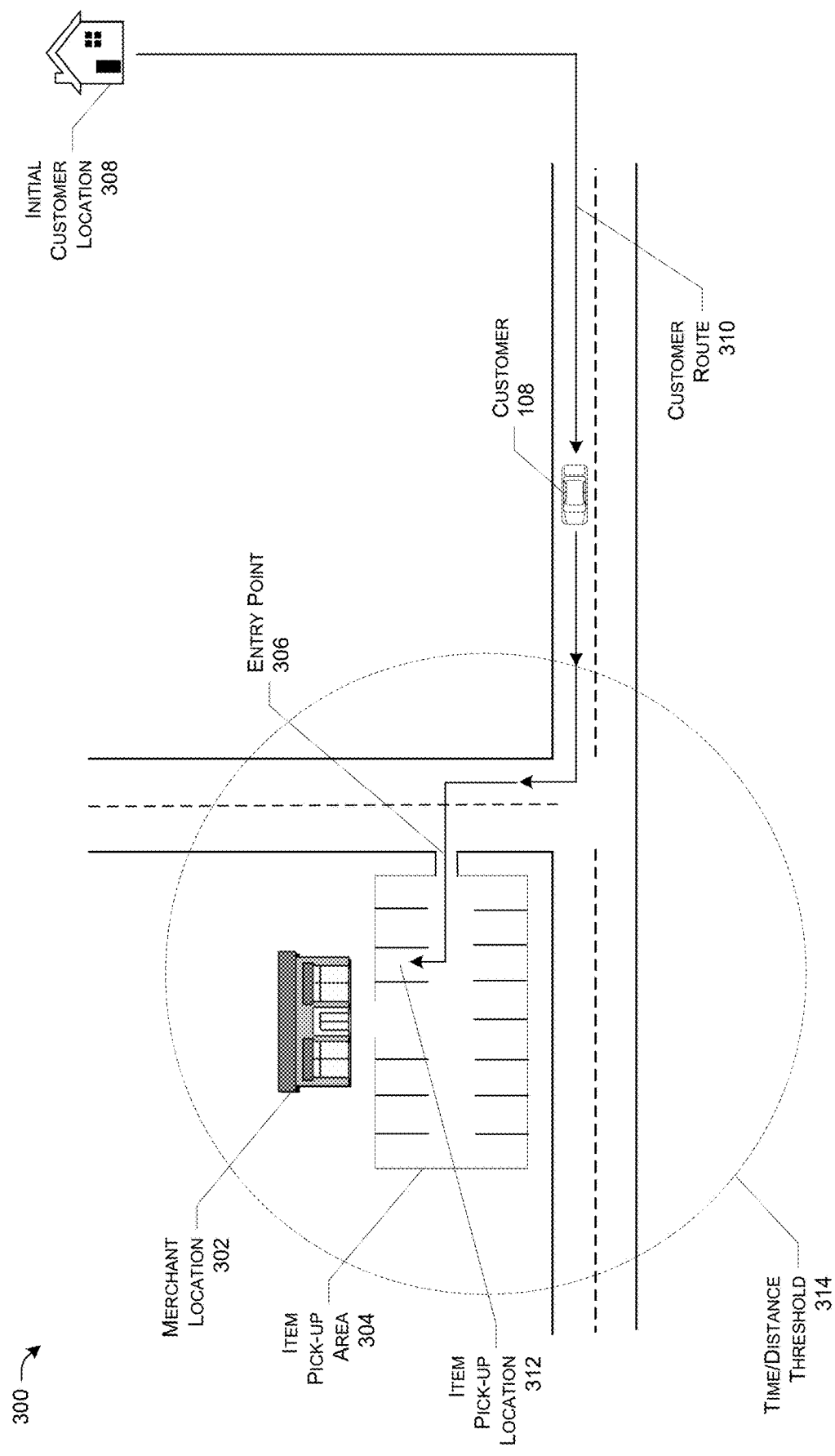
FIG. 3 is a diagram illustrating a merchant location, a customer in transit to the merchant location, and a determination of an offset between an ETA and an arrival time of the customer at the merchant location.

FIG. 3 illustrates an example diagram 300 that depicts a customer 108 that is transit to a merchant location 302, possibly to pick up items 116 from the merchant location 302. As shown in FIG. 3, the merchant location 302 may have an item pick-up area 304, which may be designated for customers 108 to pick up items 116 from the merchant location 302. For instance, the item pick-up area 304 may be a parking lot or other designated area proximate to the merchant location 302. The diagram 300 also includes an entry point 306 that corresponds to a location from which customers 108 enter the item pick-up area 304. For instance, the entry point 306 may be an entrance from a street/road to a parking lot at the merchant location 302.

The diagram 300 further illustrates an initial customer location 308, which may be a location from which the customer 108 initiated travel to the merchant location 302 (e.g., a residence, a workplace, a location detected by one or more sensors of a customer device 110, etc.). The customer 108 may travel to the customer location 302 via a particular customer route 310, which is indicated by the arrows extending from the initial customer location 308 to the item pick-up location 312 within the item pick-up area 304. As shown, the customer 108 is illustrated as traveling to the merchant location 302 via a vehicle, such as a car. However, the customer 108 may be traveling to the merchant location 302 using other modes of transportation, such as walking, running, bicycling, using public transportation, etc. The item pick-up location 312 may be a parking spot or other designated area at which the customer 108 parks or stops to pick up his/her items 116 from the merchant location 302. The item pick-up location 312 may be within the item pick-up area 304.

While the customer 108 is in transit to the merchant location 302, the service provider 102 may receive, from the customer device 110 of the customer 108, sensor data 126 (e.g., location data) and/or a generic ETA 224 that indicates a time at which the customer 108 is predicted to arrive at the merchant location 302. The diagram 300 further includes a time/distance threshold 314, which may correspond to a predetermined amount of time or a predetermined distance from the merchant location 302. The time/distance threshold 314 for a particular merchant location 302 may vary based on the amount of traffic in proximity to the merchant location 302 and/or the size of the item pick-up area 304. For example, if a merchant location 302 tends to have a greater amount of traffic or has a large parking lot that customers 108 need to navigate through to reach the item pick-up area 304, the time/distance threshold 314 may be smaller. In some embodiments, the service provider 102 may calculate the customer-based ETA 136 and/or the merchant location-based ETA 138 at any point while the customer 108 is in transit to the merchant location 302 along the customer route 310. However, in other embodiments, the service provider 102 may refrain from determining or generating the customer-based ETA 136 or the merchant location-based ETA 138 when the current location of the customer 108 is a distance from the merchant location 302 that is greater than the time/distance threshold 314, or if and estimated amount of time of the customer 108 to the merchant location 302 is greater than the time/distance threshold 314.

In some embodiments, before or while the customer 108 is in transit to the merchant location, the service provider 102 and/or the customer device 110 may determine a generic ETA 224 for the customer 108. Based on customer arrival data 130 associated with the customer 108, the service provider 102 may determine an arrival time 228 of the customer 108, which may correspond to the time at which the customer arrived, was greeted, was checked in, etc. at the merchant location 302. Based on the difference between the generic ETA 224 and the customer arrival time 228, the service provider 102 may determine a customer offset 132 with respect to the customer 108. The customer offset 132 may represent whether the customer 108 arrived at the merchant location 302 prior to, at the same time as, or subsequent to the time of the generic ETA 224. This may be based on whether the customer 108 followed the customer route 310, whether the customer 108 traveled less than, at, or greater than the speed limit along the customer route 310, whether the customer 108 stopped along the way to the merchant location 302, and so on. Similarly, the service provider 102 may determine a merchant location offset 134 with respect to the customer 108 and the merchant location 302, where the merchant location offset 134 may also be determined based on other customers 108 that have traveled to the merchant location. The merchant location offset 134 may arise as a result of an additional amount of time spent by customers 108 navigating through the item pick-up area 304 (e.g., a parking lot at the merchant location 302) to the item pick-up location 312 once they have entered the item pick-up area via 304 the entry point 306. The merchant location offset 134 may also correspond to time spent finding the item pick-up location 312 (e.g., finding a parking spot).

In other embodiments, while the customer 108 is in transit to the merchant location 302, the service provider 102 may modify the generic ETA 224 of the customer 108 to generate a refined and more accurate ETA. That is, based on application of the customer offset 132 previously determined for the customer 108 to the generic ETA 224, the service provider 102 may generate a customer-based ETA 136 for the customer 108. Moreover, by applying the merchant location offset 134 that is particular to the merchant location 302, the service provider 102 may generate a merchant location-based ETA 138 for the customer 108. The customer-based ETA 136 and/or the merchant location-based ETA 138 may be less than, the same as, or greater than the generic ETA 224 previously determined for the customer 108.

Figure 4:
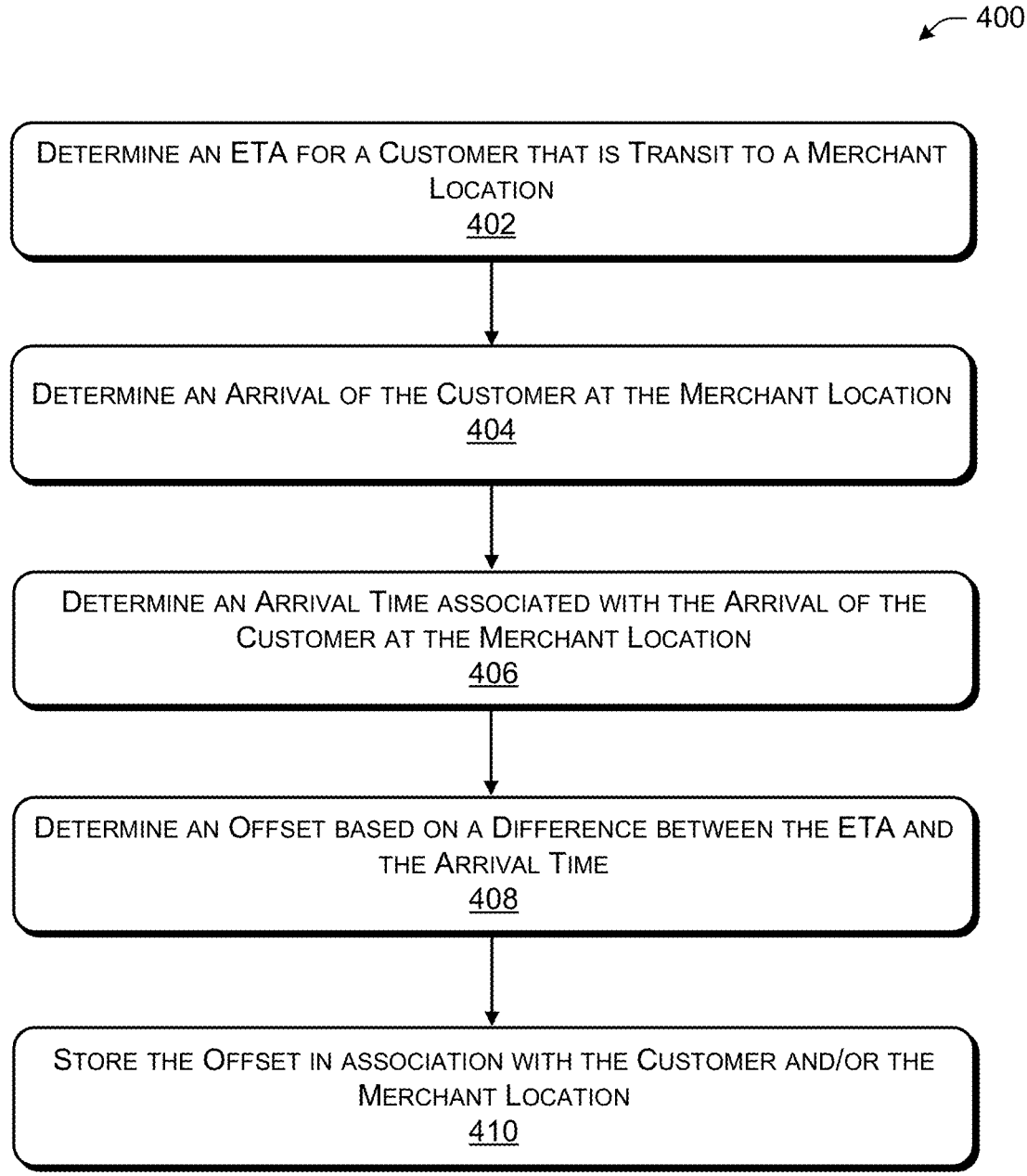
FIG. 4 is a flow diagram illustrating an example process of determining an offset between an ETA of a customer that is in transit to a merchant location and an arrival time of the customer at the merchant location.
Figure 5:
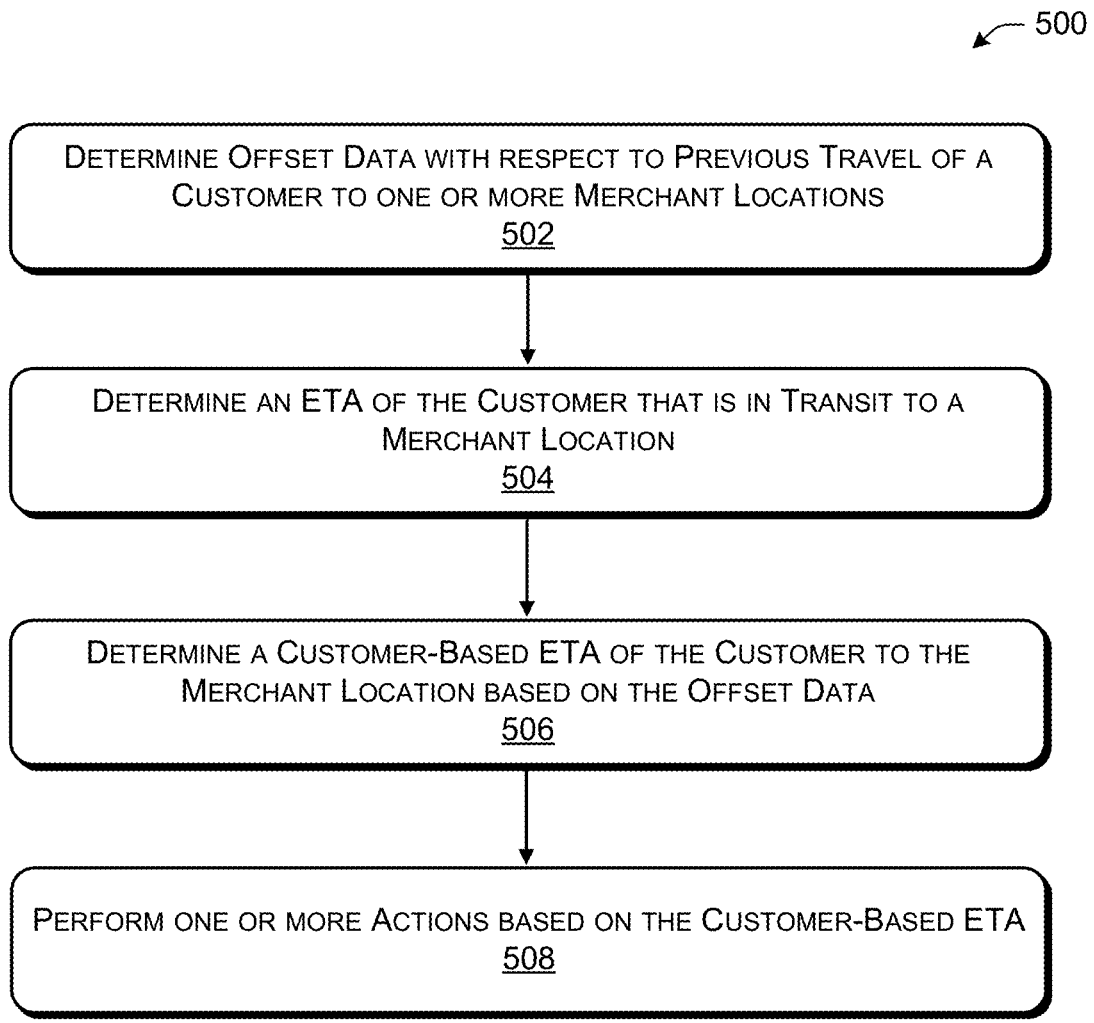
FIG. 5 is a flow diagram illustrating an example process of determining a customer-based ETA based on an offset associated with previous travel of the customer to one or more merchant locations.
Figure 6:
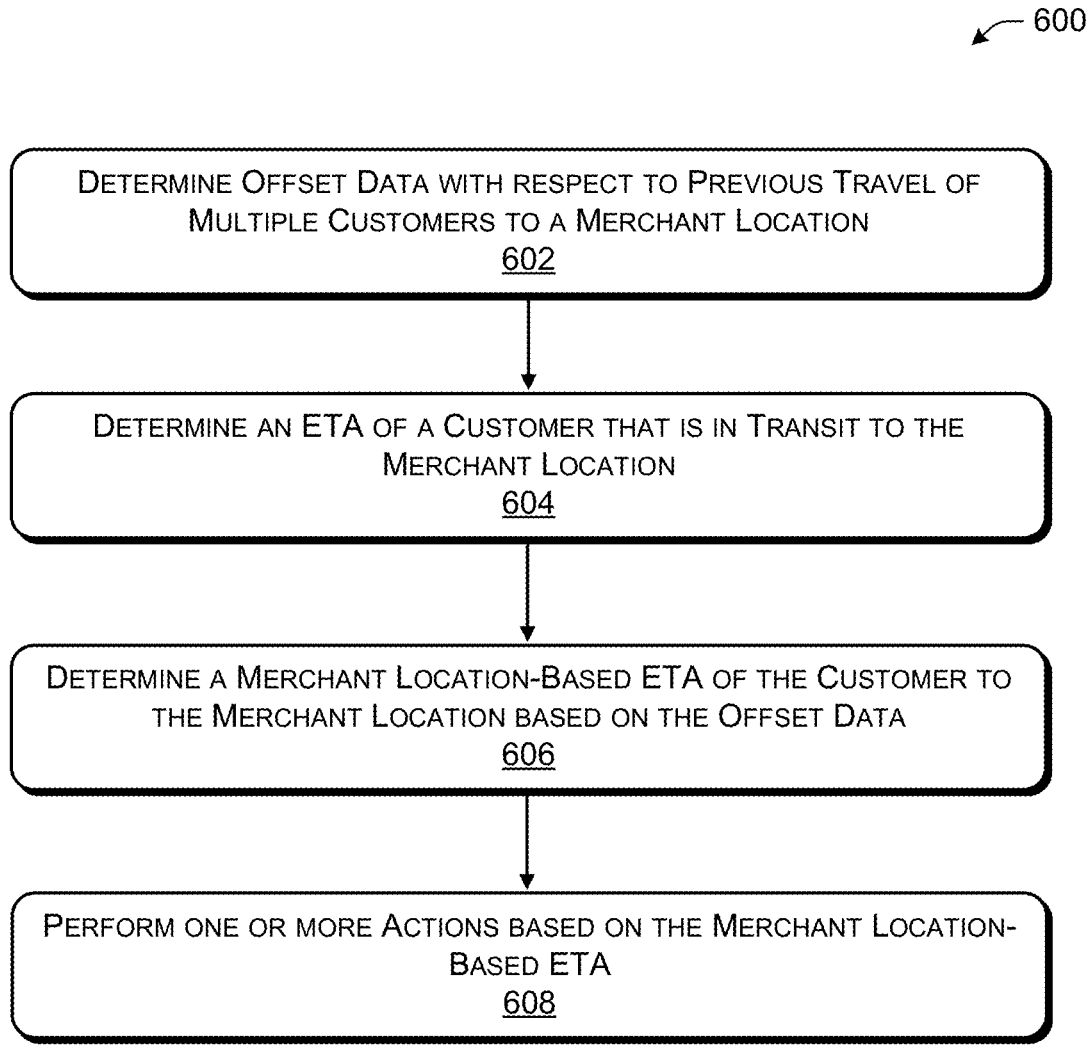
FIG. 6 is a flow diagram illustrating an example process of determining a merchant location-based ETA based on an offset associated with previous travel of multiple customers to a particular merchant location.

FIGS. 4-6 illustrate example processes of determining a customer-based ETA and/or a merchant location-based ETA with respect to a customer and a merchant location, respectively. These processes (as well as each process described herein) are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process.

FIG. 4 illustrates a flow diagram of an example process 400 of determining an offset between an ETA and an arrival time with respect to a customer in transit to a merchant location. Moreover, the following actions described with respect to FIG. 4 may be performed by the service provider 102 and/or the content server(s) 114, as illustrated with respect to FIGS. 1-3.

Block 402 illustrates determining an ETA for a customer that is in transit to a merchant location. The service provider 102 and/or a computing device 110 of the customer 108 may determine a generic ETA 224, which may indicate a time that the customer 108 is predicted to arrive at the merchant location. In some embodiments, the ETA need not correspond to the customer 108 traveling to a merchant location and may instead correspond to one or more segments in which the customer 108 has traveled. Each of the segments may have a beginning location and an end location.

Block 404 illustrates determining an arrival of the customer at the merchant location. The service provider 102 may receive customer arrival data 130 from the customer device 110 and/or a merchant device 106 located at the merchant location. The arrival data 130 may indicate that the customer 108 has in fact arrived at the merchant location, and the arrival of the customer 108 may be determined as a result of one or more devices at the merchant location (e.g., cameras, proximity sensors, etc.), the customer 108 being greeted and checked in via a merchant device 106 at the merchant location, and/or the customer 108 inputting information via his/her customer device 110. The arrival of the customer 108 may also correspond to the arrival of the customer 108 at an end location of a segment, as described above. Confirmation of arrival of the customer 108 at the end location may be based on location/geolocation data received from a customer device 110 of the customer 108.

Block 406 illustrates determining an arrival time associated with the arrival of the customer at the merchant location. The customer arrival data 130 may be accompanied by a timestamp that indicates when the customer 108 was detected, greeted, checked in, etc. at the merchant location or an end location of a segment traveled by the customer 108. Accordingly, the timestamp may indicate a time that the customer 108 arrived at the merchant location, a time at which the customer 108 arrived at a designated item pick-up 124 area at the merchant location (e.g., the arrival time 228), or a time at which the customer 108 arrived at an end location of a segment traveled by the customer 108.

Block 408 illustrates determining an offset based on a difference between the ETA and the arrival time. In some embodiments, the time associated with the generic ETA 224 determined for the customer 108 may vary from the actual arrival time 228 of the customer 108 at the merchant location. A customer offset 132 may be specific to the customer 108 and may indicate that the customer 108 arrived at the merchant location/end location before, at the same time as, or after the generic ETA 224. A merchant location offset 134 may indicate whether customers 108 that travel to the merchant location typically arrive before, around the same time as, or after the generic ETA 224. The offset of the customer 108 may be considered when determining the merchant location offset 134.

In other embodiments, the customer offset 132 may be determined based on a generic ETA 224 for a portion of travel by the customer 108, such as a segment of a route as the customer 108 is in transit to the merchant location, and a time other than the arrival time 228. That is, the service provider 102 may determine the customer offset 132 even if the customer 108 did not arrive at the merchant location. In these embodiments, the service provider 102 may determine the generic ETA 224 for the customer 108 to a location that is outside of a threshold distance or a threshold time from the merchant location. This location may correspond to a location or check point that the customer 108 arrived at along a route and/or prior to arrival of the customer 108 at the merchant location. Based on location data received from the customer device 110 of the customer 108, the service provider 102 may determine when the customer 108 actually arrived at that location. The customer offset 132 may then be determined based on a difference between the time that the customer 108 was predicted to arrive at that location and a time that the customer 108 actually arrived at that location. In some instances, this customer offset 132 may be used to determine a refined customer-based ETA 136 for the remainder of the travel of the customer 108 to the merchant location. For instance, based on the customer offset 132 for a first portion of travel to the merchant location, the service provider 102 may predict a more refined and accurate time that the customer 108 will likely arrive at the merchant location. However, in other embodiments, this customer offset 132 may be used to generate customer-based ETAs for the customer 108 for travel at a later time.

Block 410 illustrates storing the offset in association with the customer and/or the merchant location. The customer offset 132 may be stored in association with the customer 108 (or a customer ID of the customer 108) and the merchant location offset 134 may be stored in association with the specific merchant location (or a merchant location ID of the merchant location). Either offset may also be associated with a time of day, a day of the week, a time of year, weather conditions, traffic conditions, and so on.

FIG. 5 illustrates a flow diagram of an example process 500 of determining a customer-based ETA with respect to a customer in transit to a merchant location. Moreover, the following actions described with respect to FIG. 5 may be performed by the service provider 102 and/or the content server(s) 114, as illustrated with respect to FIGS. 1-3.

Block 502 illustrates determining offset data with respect to previous travel of a customer to one or more merchant locations. In various embodiments, the service provider 102 may determine instances in which a customer 108 traveled to one or more merchant locations. For each instance, the service provider 102 may determine a generic ETA 224 and an actual arrival time 228 of the customer 108 at the merchant location. The difference between these two times may be referred to as the customer offset 132, which may indicate whether the customer 108 typically arrives at merchant locations prior to, around the same time as, or after the generic ETA 224. The service provider 102 may also determine an average customer offset 132. As stated above, the offset data may correspond to segments that the customer 108 has previously traveled. For each segment, the service provider 102 may determine a generic ETA 224 at which the customer 108 is expected to arrive at an end location of the segment or an estimated travel time for the customer 108 traveling from a beginning location of the segment to that end location. The service provider 102 may also determine, based on location data received from a customer device 110 of the customer 108, a time at which the customer 108 arrived at the end location of the segment or an actual travel time of the customer 108 from the beginning location of the segment to the end location of the segment. With respect to a segment, the offset may correspond to a difference between the generic ETA 224 and the arrival time at the end location or a difference between the estimated travel time and the actual travel time corresponding to that segment.

Block 504 illustrates determining an ETA of the customer that is in transit to a merchant location. Upon determining that a customer 108 is in transit to a merchant location, possibly to pick up items 116 from the merchant location, the service provider 102 and/or a customer device 110 of the customer 108 may determine a generic ETA 224 for the customer 108, where the generic ETA 224 may correspond to a time that the customer 108 is predicted to arrive at the merchant location.

Block 506 illustrates determining a customer-based ETA of the customer to the merchant location based on the offset data. The service provider 102 may generate a refined and more accurate ETA for the customer 108 by applying the customer offset 132 to the generic ETA 224. For instance, if the customer 108 typically arrives after the generic ETA 224, the service provider 102 may add time to the generic ETA 224, and vice versa. That is, if the customer 108 typically arrives at merchant locations one minute after the generic ETA 224, the service provider 102 may determine the customer-based ETA 136 by adding a minute to the generic ETA 224. In some embodiments, the service provider 102 may determine the refined ETA based on a combination of the customer offset 132 and the merchant location offset 134. Moreover, a greater weight may be applied to one of the offsets.

Block 508 illustrates performing one or more actions based on the customer-based ETA. Upon determining the customer-based ETA 136, the service provider 102 may send instructions to a merchant device 106 at the merchant location to begin assembling items 116 ordered by the customer 108. The service provider 102 may also send the customer-based ETA 136 to a merchant device 106 at the merchant location or to a customer device 110 of the customer 108.

FIG. 6 illustrates a flow diagram of an example process 600 of determining a merchant location-based ETA with respect to a customer in transit to a merchant location. Moreover, the following actions described with respect to FIG. 6 may be performed by the service provider 102 and/or the content server(s) 114, as illustrated with respect to FIGS. 1-3.

Block 602 illustrates determining offset data with respect to previous travel of multiple customers to a merchant location. In various embodiments, the service provider 102 may determine instances in which customers 108 have traveled to a specific merchant location. For each instance, the service provider 102 may determine a generic ETA 224 and an actual arrival time 228 of the customer 108 at the merchant location. The difference between these two times may be referred to as the merchant location offset 134, which may indicate whether customers 108 typically arrive at the merchant location prior to, around the same time as, or after the generic ETA 224. The service provider 102 may also determine an average merchant location offset 134. For individual customer 108, the service provider 102 may also determine the offset data based on a difference between an estimated travel time for the customer 108 to the merchant location and an actual travel time of the customer 108 to the merchant location.

Block 604 illustrates determining an ETA of a customer that is in transit to the merchant location. Upon determining that a customer 108 is in transit to that same merchant location, possibly to pick up items 116 from the merchant location, the service provider 102 and/or a customer device 110 of the customer 108 may determine a generic ETA 224 for the customer 108, where the generic ETA 224 may correspond to a time that the customer 108 is predicted to arrive at the merchant location.

Block 606 illustrates determining a merchant location-based ETA of the customer to the merchant location based on the offset data. The service provider 102 may generate a refined and more accurate ETA for the customer 108 by applying the merchant location offset 134 to the generic ETA 224. For instance, if customers 108 typically arrive after the generic ETA 224 with respect to that merchant location, the service provider 102 may add time to the generic ETA 224, and vice versa. That is, if customers 108 typically arrive at that merchant locations one minute after the generic ETA 224, the service provider 102 may determine the merchant location-based ETA 138 by adding a minute to the generic ETA 224. In some embodiments, the service provider 102 may determine the refined ETA based on a combination of the customer offset 132 and the merchant location offset 134. Moreover, a greater weight may be applied to one of the offsets.

Block 608 illustrates performing one or more actions based on the merchant location-based ETA. Upon determining the merchant location-based ETA 138, the service provider 102 may send instructions to a merchant device 106 at the merchant location to begin assembling items 116 ordered by the customer 108. The service provider 102 may also send the merchant location-based ETA 138 to a merchant device 106 at the merchant location or to a customer device 110 of the customer 108.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising: one or more processors; memory; and one or more computer-executable instructions stored in the memory and executable by the one or more processors to perform operations comprising: determining first instances in which a customer traveled to one or more item pick-up locations to pick up first food items; determining a first offset based on first differences between first estimated times of arrival (ETAs) at which the customer was predicted to arrive at the one or more item pick-up locations and first arrival times at which the customer arrived at the one or more item pick-up locations, the first offset corresponding to a first amount of time; determining second instances in which multiple customers each traveled to an item pick-up location to pick up second food items, the item pick-up location including an entry point and a designated area at which customers pick up food items from the item pick-up location; determining a second offset based on second differences between second ETAs at which the multiple customers were predicted to arrive at the item pick-up location and second arrival times at which the multiple customers arrived at the item pick-up location, the second offset corresponding to a second amount of time; receiving, via a mobile application that resides on a customer device of the customer and that is associated with a service provider, an order for third food items; receiving, via the mobile application and while the customer is in transit to the item pick-up location, multiple location data points that are each received at different times; processing the multiple location data points to determine a third ETA that indicates a predicted time at which the customer is to arrive at the item pick-up location, the third ETA being determined by at least one of the service provider or the customer device; generating a fourth ETA based on at least one of the first offset or the second offset, the fourth ETA being different from the third ETA, wherein generating the fourth ETA comprises: determining, based on the first offset, a first portion of the fourth ETA from an initial location of the customer to the entry point; and determining, based on the second offset, a second portion of the fourth ETA from the entry point to the designated area; and sending, to a device located at the item pick-up location and based on at least one of the third ETA or the fourth ETA, an instruction to assemble the food items for pick-up by the customer.

2. The system as recited in claim 1, wherein generating the fourth ETA comprises:
adding the at least one of the first offset or the second offset to the third ETA; or
subtracting the at least one of the first offset or the second offset from the third ETA.

3. The system as recited in claim 1, wherein the operations further comprise:
storing the first offset in association with a customer identifier of the customer; and
storing the second offset in association with an item pick-up location identifier of the item-pick up location, wherein generating the fourth ETA is based on at least one of a time of day, a day of week, a time of year, current weather conditions, or current traffic conditions.

4. A method comprising: determining, by one or more processors, one or more instances in which a customer traveled one or more segments having one or more beginning locations and one or more end locations; determining, by the one or more processors, an offset based at least in part on a difference between one or more estimated times of arrival (ETAs) at which the customer was predicted to arrive at the one or more end locations and one or more arrival times at which the customer arrived at the one or more end locations; receiving, from a customer device of the customer and while the customer is in transit to an end location of a segment, multiple location data points; determining, by the one or more processors and based at least in part on the multiple location data points, a first ETA indicating a first time at which the customer is predicted to arrive at the end location; and determining, by the one or more processors and based at least in part on the offset, a second ETA indicating a second time at Which the customer is predicted to arrive at the end location, wherein determining the second ETA comprises: adding an amount of time that corresponds to the offset to the first time or an estimated travel time corresponding to the first ETA, the amount of time being prior to or after the one or more ETAs; subtracting the amount of time from the first time or the estimated travel time; multiplying the first time or the estimated travel time by a percentage that corresponds to the offset; adding a percentage amount of time that corresponds to the percentage to the first time or the estimated travel time; or subtracting the percentage amount of time from the first time or the estimated travel time.

5. The method as recited in claim 4, further comprising:
determining one or more contextual factors associated with the one or more instances, the one or more contextual factors including at least one of time of day, day of week, time of year, traffic conditions, or weather conditions;
storing the offset and the one or more contextual factors in association with a customer identifier of the customer; and
determining the second ETA based at least in part on the one or more contextual factors.

6. The method as recited in claim 4, further comprising determining the one or more arrival times based at least in part on one or more timestamps associated with arrival data, wherein the arrival data is determined based at least in part on at least one of location data received from the customer device, one or more proximity sensors or one or more cameras located at the end location, stop event data associated with the customer while the customer is in transit to the end location, first check-in data received from a merchant device located at the end location, or second check-in data received from the customer device.

7. The method as recited in claim 4, wherein the end location is a merchant location that offers items for pick-up, further comprising:
determining one or more second instances in which multiple customers each traveled to the merchant location;
determining a second offset based at least in part on one or more estimated travel times of the multiple customers to the merchant location and one or more actual travel times of the multiple customers to the merchant location; and
determining the second ETA based at least in part on the second offset.

8. The method as recited in claim 7, further comprising storing the second offset in association with a merchant location identifier of the merchant location.

9. The method as recited in claim 4, wherein the end location is a merchant location that offers items for pick-up, further comprising at least one of:
sending, to a merchant device located at the merchant location, an instruction to begin assembling one or more items for pick-up by the customer, the one or more items previously ordered by the customer;
sending, to the merchant device, the second ETA; or
sending, to the customer device, the second ETA.

10. The method as recited in claim 4, wherein the multiple location data points include a first location data point indicating a first location of the customer device at a first time and a second location data point indicating a second location of the customer device at a second time that is subsequent to the first time, and wherein determining the first ETA comprises:
determining the first ETA based at least in part on the first location data point; and
updating the first ETA based at least in part on the second location data point.

11. The method as recited in claim 4, further comprising:
determining that the customer is equal to or less than a threshold distance from the end location; and
sending, to a device associated with the end location and based at least in part on the customer being equal to or less than the threshold distance from the end location, an instruction to begin assembling one or more items for pick-up by the customer, the one or more items previously ordered by the customer.

12. The method as recited in claim 4, further comprising:
determining that the customer is equal to or less than a threshold amount of time from arriving at the end location; and
sending, to a device associated with the end location and based at least in part on the customer being equal to or less than the threshold amount of time from arriving at the end location, an instruction to begin assembling one or more items for pick-up by the customer, the one or more items previously ordered by the customer.

13. The method as recited in claim 4, further comprising sending, to a device associated with the end location, an instruction to obtain one or more items for pick-up by the customer from at least one of shelving, a refrigerator, or a freezer at the end location, the one or more items previously ordered by the customer.

14. The method as recited in claim 4, wherein the instruction includes requesting that the one or more items be packaged and available for pick-up by the customer prior to or at a specified time.

15. A method comprising: determining, by one or more processors, one or more instances in which customers traveled to a merchant location; determining, by the one or more processors, an offset based at least in part on a difference between one or more estimated travel times of the customers to the merchant location and one or more actual travel times of the customers to the merchant location, the offset corresponding to an amount of time that is greater than or less than the one or more estimated travel times, and the amount of time representing the customers traveling from an entry point to the merchant location to a designated area for the pick-up of items; receiving, from a customer device of a customer and while the customer is in transit to the merchant location, multiple location data points; determining, by the one or more processors and based at least in part on the multiple location data points, a first ETA indicating a first time at which the customer is predicted to arrive at the merchant location; and determining, by the one or more processors and based at least in part on the offset, a second ETA indicating a second time at which the customer is predicted to arrive at the merchant location.

16. The method as recited in claim 15, wherein determining the second ETA comprises:
adding the amount of time to the first time or an estimated travel time corresponding to the first ETA;

subtracting the amount of time from the first time or the estimated travel time;
multiplying the first time or the estimated travel time by a percentage that corresponds to the offset;
adding a percentage amount of time that corresponds to the percentage to the first time or the estimated travel time; or
subtracting the percentage amount of time from the first time or the estimated travel time.

17. The method as recited in claim 15, further comprising determining the one or more actual travel times based at least in part on one or more timestamps associated with arrival data, wherein the arrival data is determined based at least in part on at least one of location data received from the customer device, one or more proximity sensors or one or more cameras located at the merchant location, stop event data associated with the customer while the customer is in transit to the merchant location, first check-in data received from a merchant device located at the merchant location, or second check-in data received from the customer device.

18. The method as recited in claim 15, further comprising:
determining one or more second instances in which the customer traveled one or more segments having one or more beginning locations and one or more end locations;
determining a second offset based at least in part on one or more second ETAs at which the customer was predicted to arrive at the one or more end locations and one or more second arrival times at which the customer arrived at the one or more end location; and
determining the second ETA based at least in part on the second offset.

19. The method as recited in claim 15, further comprising at least one of:
sending, to a merchant device located at the merchant location, an instruction to begin assembling one or more items for pick-up by the customer, the one or more items previously ordered by the customer;
sending, to the merchant device, the second ETA; or
sending, to the customer device, the second ETA.

20. The method as recited in claim 15, further comprising:
determining, based at least in part on first location data received from the customer device, that the customer is located at the entry point at a third time;
determining, based at least in part on second location data received from the customer device, that the customer is located at the designated item pick-up area at a fourth time;
determining the amount of time based at least in part on a difference between the third time and the fourth time; and
determining the second ETA based at least in part on the amount of time.

\* \* \* \* \*